(12) United States Patent
Ladouceur

(10) Patent No.: US 7,706,837 B2
(45) Date of Patent: Apr. 27, 2010

(54) DISABLING OPERATION OF A CAMERA ON A HANDHELD MOBILE COMMUNICATION DEVICE BASED UPON ENABLING OR DISABLING DEVICES

(75) Inventor: Norman M. Ladouceur, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 845 days.

(21) Appl. No.: 11/469,486

(22) Filed: Sep. 1, 2006

(65) Prior Publication Data

US 2008/0058006 A1 Mar. 6, 2008

(51) Int. Cl.
*H04M 1/00* (2006.01)
(52) U.S. Cl. ............... 455/556.1; 455/418; 455/566; 455/575.1; 348/374
(58) Field of Classification Search ............. 455/556.1, 455/90.3, 403, 418, 550.1, 566, 575.1, 575.3; 348/14.02, 176, 335, 374; 396/56
See application file for complete search history.

(56) References Cited

U.S. PATENT DOCUMENTS

| | | | | |
|---|---|---|---|---|
| 6,128,475 | A * | 10/2000 | Wicks et al. | ............. 455/575.4 |
| 2003/0174240 | A1 | 9/2003 | Wada et al. | |
| 2004/0027474 | A1* | 2/2004 | Aoyama et al. | ............. 348/335 |
| 2004/0185921 | A1 | 9/2004 | Tornaghi | |
| 2005/0020325 | A1* | 1/2005 | Enger et al. | ............. 455/575.3 |
| 2005/0060554 | A1* | 3/2005 | O'Donoghue | ............. 713/183 |
| 2005/0143124 | A1 | 6/2005 | Kennedy et al. | |

FOREIGN PATENT DOCUMENTS

| | | |
|---|---|---|
| EP | 1414218 A1 | 4/2004 |
| EP | 1435766 A | 7/2004 |
| WO | 2005022473 A | 3/2005 |

OTHER PUBLICATIONS

European Search Report 06119997.2, Jan. 30, 2007.

* cited by examiner

*Primary Examiner*—Matthew D Anderson
*Assistant Examiner*—Shaima Q Aminzay
(74) *Attorney, Agent, or Firm*—Novak Druce + Quigg LLP

(57) ABSTRACT

A handheld communication device capable of transmitting and receiving at least voice and text communication. The device has a body assembly including a front face arranged to be directed toward an operator of the device when held in a text communicating orientation. A display screen and a text-input keyboard are included and are each exposed at the front face of the body assembly. The keyboard has a plurality of keys that include a set of alphabetic keys with which either QWERTY-, QWERTZ- AZERTY- or Dvorak-arranged alphabetic characters are associated. An integrated camera assembly is also included that is configured for taking photographs and the communication device enabled to wirelessly communicate photographs taken with the camera assembly to a remote receiver. The camera assembly includes a photo-initiating actuator having an actuated position and an unactuated position and at least one of a selective enablement device or a selective disablement device.

14 Claims, 18 Drawing Sheets

| 1 | 2 | 3 | 4 | 5 | 6 | 7 | 8 | 9 | 0 |
|---|---|---|---|---|---|---|---|---|---|
|   |   |   | P | Y | F | G | C | R | L |
| A | O | E | U | I | D | H | T | N | S |
|   | Q | J | K | X | B | M | W | V | Z |

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L |   |
| Z | X | C | V | B | N | M |   |   |   |

44

| 7 | 8 | 9 |
|---|---|---|
| 4 | 5 | 6 |
| 1 | 2 | 3 |
|   | 0 |   |

| 1 | 2 | 3 |
|---|---|---|
| 4 | 5 | 6 |
| 7 | 8 | 9 |
| * | 0 | # |

42, 43

| 1 | 2<br>abc | 3<br>def |
|---|---|---|
| 4<br>ghi | 5<br>jkl | 6<br>mno |
| 7<br>pqrs | 8<br>tuv | 9<br>wxyz |
| *<br>shift | 0 | #<br>space |

DISABLING OPERATION OF A CAMERA ON A HANDHELD MOBILE COMMUNICATION DEVICE BASED UPON ENABLING OR DISABLING DEVICES

FIELD

The present disclosure is directed toward a wireless handheld communication device, and more particularly, to controlling a camera module on the device with enablement and disablement devices

BACKGROUND

With the advent of more robust wireless communications systems, compatible handheld communication devices are becoming more prevalent, as well as advanced. In a broader sense, these devices are referred to as handheld electronic devices, which include devices without communication functions. Where in the past such handheld communication devices typically accommodated either voice (cell phones) or text transmission (pagers and PDAs), today's consumer often demands a combination device capable of performing both types of transmissions, including sending and receiving e-mail. The suppliers of such mobile communication devices and underlying service providers are anxious to meet these demands, but the combination of voice and textual messaging, as well as other functionalities such as those found in PDAs, have caused designers to have to improve the means by which information is input into the devices by the user, as well as provide better facilitation for the user to navigate within the menus and icon presentations necessary for efficient user interface with these more complicated devices.

Due to recent advances in technology, digital camera components are now small enough to be placed inside handheld communication devices so that the devices are able to take and store digital pictures. The addition of a digital camera to these devices has proven to be quite popular among the general population. However, many corporations and governmental agencies are wary of small portable cameras, like those provided by these devices.

Camera lenses are commonly made of glass or plastic. They are used to direct beams of light onto the image sensor. The aperture, which is controlled automatically in most digital cameras, controls the amount of light that passes through the lens to the image sensor. The digital shutter regulates the image sensor's exposure to light. Specifically, the digital shutter simply turns off the image sensor, essentially serving to close the "shutter", and thus eliminating the need for the moving parts found in an analog camera. However, some digital cameras supplement a digital shutter with a mechanical shutter.

The focal length of a digital camera is determined by the image sensor's size and the distance from the lens to the subject to be photographed. As the image sensor gets smaller the focal length will also be reduced. Similarly, as the camera nears the subject to be photographed, the focal length will also be reduced. The focal length of the lens is usually adjustable to a limited extent. In digital cameras, the adjustability of the focal length is described as the optical zoom of the camera.

In a digital camera, the image sensor is typically either a CCD (charge-coupled device) or a CMOS (complimentary metal oxide semiconductor) sensor. Both of these sensors transform the light information into electrical signals.

The resolution of the images produced by the image sensor is defined in terms of pixels or megapixels, which is approximately one million pixels. More pixels enable the camera to produce pictures of higher resolution. For a 4×6 picture, a two megapixel digital camera produces an image that is comparable to a standard 35 mm camera. Similarly for a 8×10 picture, a three megapixel digital camera produces an image that is comparable to a standard 35 mm camera.

The electric signals produced by the image sensor are sent to the microprocessor, where they are processed and configured to be stored in an electronic format. Picture formats include TIFF, JPEG, and other familiar types. The picture can then be saved to a fixed storage device inside the camera or a removable storage device associated with the camera. Examples of storage devices are on-board flash memory, compact flash memory cards, and secure digital (SD) cards. Picture files are normally compressed by software to increase available storage space.

The display for a digital camera is commonly a LCD (liquid crystal display). The display can be used to preview the "scene" before taking the photograph as well to show pictures stored on the camera or associated storage device. The display also normally facilitates user configuration of camera settings. Specifically, the user typically utilizes buttons or controls on the device housing to navigate the graphical user interface of the camera.

All of the components of a digital camera can be located within the housing of a handheld electronic device, thereby expanding the device's functionality to include photography. The pictures taken with these devices are generally stored onto a fixed memory within the device. Other devices make use of the removable memory options typically used to store pictures in digital cameras.

Portable cameras can be used to take pictures of confidential documents, classified research, prototypes, and other confidential subject matter. The pictures can then be stored on the device and subsequently transmitted wirelessly. Thus, confidential material can be improperly divulged and/or used for improper purposes. The ubiquitous presence of handheld communication devices in the business environment makes it difficult for businesses to control their use. The present disclosure is directed to a security system that can be utilized to disable certain features of the devices, such as an associated camera.

BRIEF DESCRIPTION OF THE DRAWINGS

Exemplary methods and arrangements conducted and configured according to the advantageous solutions presented herein are depicted in the accompanying drawings wherein:

FIG. 8 illustrates an exemplary Dvorak keyboard layout;

FIG. 9 illustrates a QWERTY keyboard layout paired with a traditional ten-key keyboard;

FIG. 10 illustrates ten digits comprising the numerals 0-9 arranged as on a telephone keypad, including the * and # astride the zero;

FIG. 11 illustrates a numeric phone key arrangement according to the ITU Standard E.161 including both numerals and letters;

DETAILED DESCRIPTION

Figure 1A:
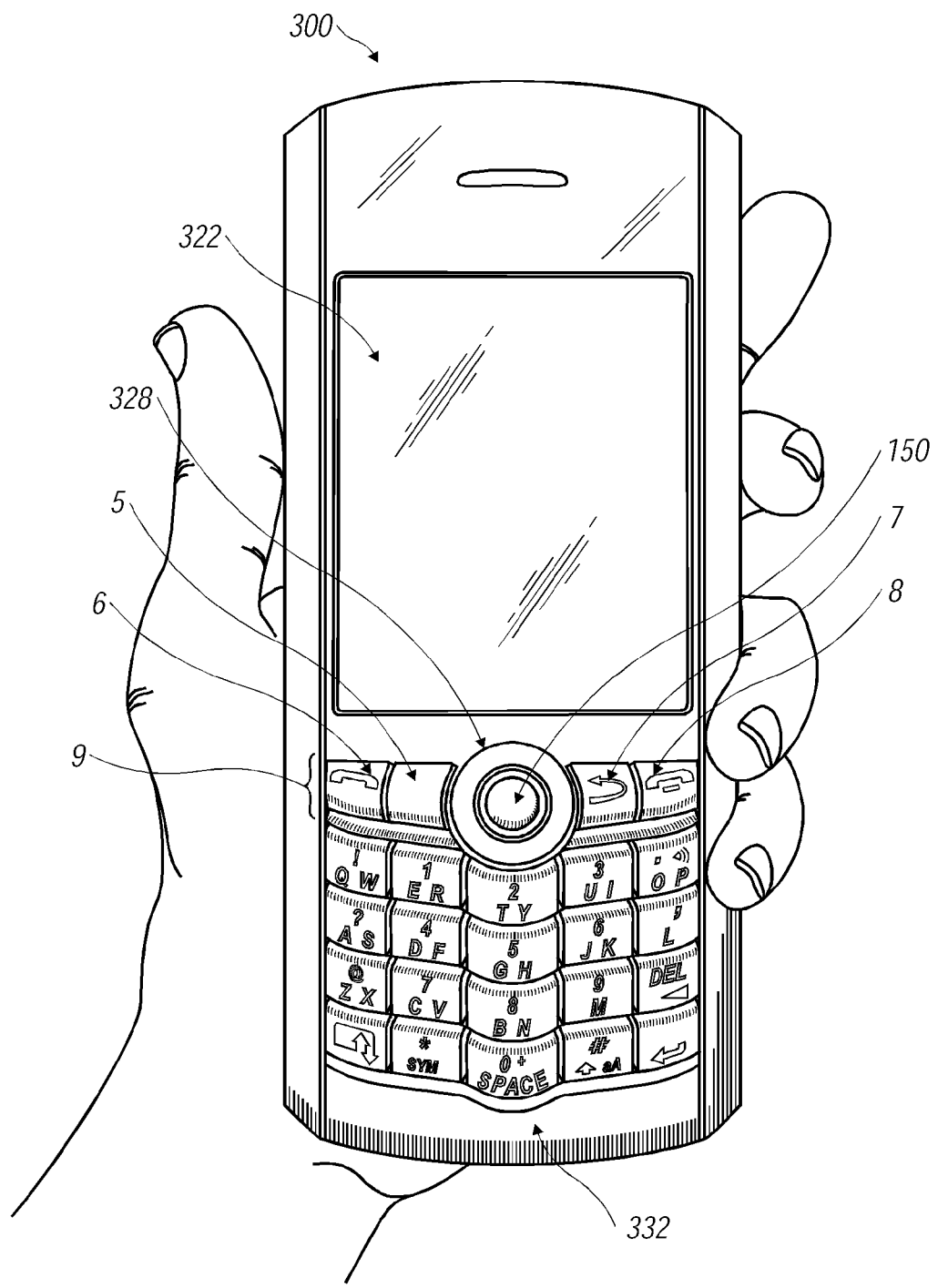
FIG. 1a is an elevational view of a handheld communication device cradled in a user's hand.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held. Therefore the size of the device must be kept relatively small; of its dimensions, limiting the width of the device is most important with respect to assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent since more importance is placed on maintaining the device's hand-cradleablability. Therefore, in order to gain greater size, the device can be advantageously configured so that its height is greater than its width, but still remain easily supported and operated in one hand.

Users have indicated a preference for handheld devices that also feature a digital camera in addition to voice and data communication functionality. Digital cameras operate along similar principles as their analog counter parts. Digital cameras are comprised of a lens, an image capture device, a microprocessor to process the image, a storage device to store images, and a screen to display images. Traditionally, a multitude of buttons and switches located on the camera housing provided the user with the controls to take pictures, adjust camera settings, and manipulate the stored pictures. A dedicated camera control button is preferably provided on the housing of the handheld device to provide quick access to the program for controlling the camera. Further details regarding components and operation of the camera/camera module will be explained later in this description.

The description below mentions several terms that are considered known to those skilled in the art. Several examples are discussed in the description thereby disclosing more specific examples of the terms used herein.

When a camera is incorporated into a handheld communication device, there is a potential for carrying the device into places where photography is prohibited. Methods and apparatus are presented herein that impose a camera restriction on the device while it is located within such a restricted area.

In addition to the digital camera, the handheld communication device can include memory, a position determiner, a controller, and preferably a configuration signal receiver. The memory of the device is capable of storing various types of data including data defining geographic boundaries of a restricted area and data defining a camera restriction imposed on the wireless handheld communication device relative to the restricted area. The information stored in memory can be received wirelessly, downloaded through a specialized port, or preloaded on the device. The position determiner typically receives satellite-based information that defines a present geographical position of the device and the position information can be used to determine whether the device is presently located in the restricted area based on a comparison to geographical boundaries of restricted areas stored in memory. The controller adapts the functionality of the camera based on the determination of whether the device is presently located in the restricted area. Preferably, a configuration signal receiver is also located within the device that receives configuration data from an enterprise administrator. This configuration data received from the enterprise administrator is preferably the geographical boundaries of the restricted areas and is stored in memory. Furthermore, the controller can disable the camera/camera module when the device has been determined to be located in the restricted area.

In another embodiment, the handheld communication device with an incorporated camera includes a processing means, memory means, camera enablement and disablement devices, position determining means, and control means. The processing means allows for receiving, processing and outputting electronic data and for outputting control signals. One example of possible processing means includes a microprocessor. The processor means is also capable of performing management tasks related to the various components and attachments to the device including communication subsystems and the display.

The memory means stores data that defines geographical boundaries of a restricted operating area and data that defines a camera restriction that is selectively imposed on the wireless handheld communication device based on whether the device is located in the restricted area. These restrictions can be established by implementing an IT policy at an organizational level, group level, or individual user level. The restrictions can be modified by an administrator or other person with the authority to change the policy settings on the IT policy server. Examples of memory means include a flash memory device, a read-only memory device, and a random access memory device. Furthermore, the memory means is capable of storing additional information that is described below in greater detail, in relation to FIG. 18, including programs 358, application data, address books 352, identification information, device state 350, IT policy information 362, connection information 360 and other personal information management (PIM) 354.

The selective enablement device allows for two modes of operation in the camera assembly, enabled mode and disabled mode. In enabled mode, a selective enablement device is associated with the camera assembly and activates the photo-initiating actuator 401. This allows an electrical signal to be sent to the processor 338 due to the photo-initiating actuator 401 moving from the unactuated position to the actuated position. The electrical signal that is sent to the processor 338 due to movement of the photo-initiating actuator 401 causes the camera assembly to take a photograph.

In the disabled mode, a selective enablement device is removed from the camera assembly which deactivates the photo-initiating actuator 401. This prevents an electrical signal from being sent to the processor 338 even if the photo-initiating actuator 401 is moved from the unactuated position to the actuated position. Without the generation of the electrical signal, no photograph can be taken by the camera assembly 570.

One example of a selective enablement device is a removable key. When the key is inserted into a key-receiver on the device 300 the camera assembly 570 enters into enabled mode to allow picture taking. If the key is removed, the device transitions or enters into the disabled mode and picture taking is prevented.

Figure 21:
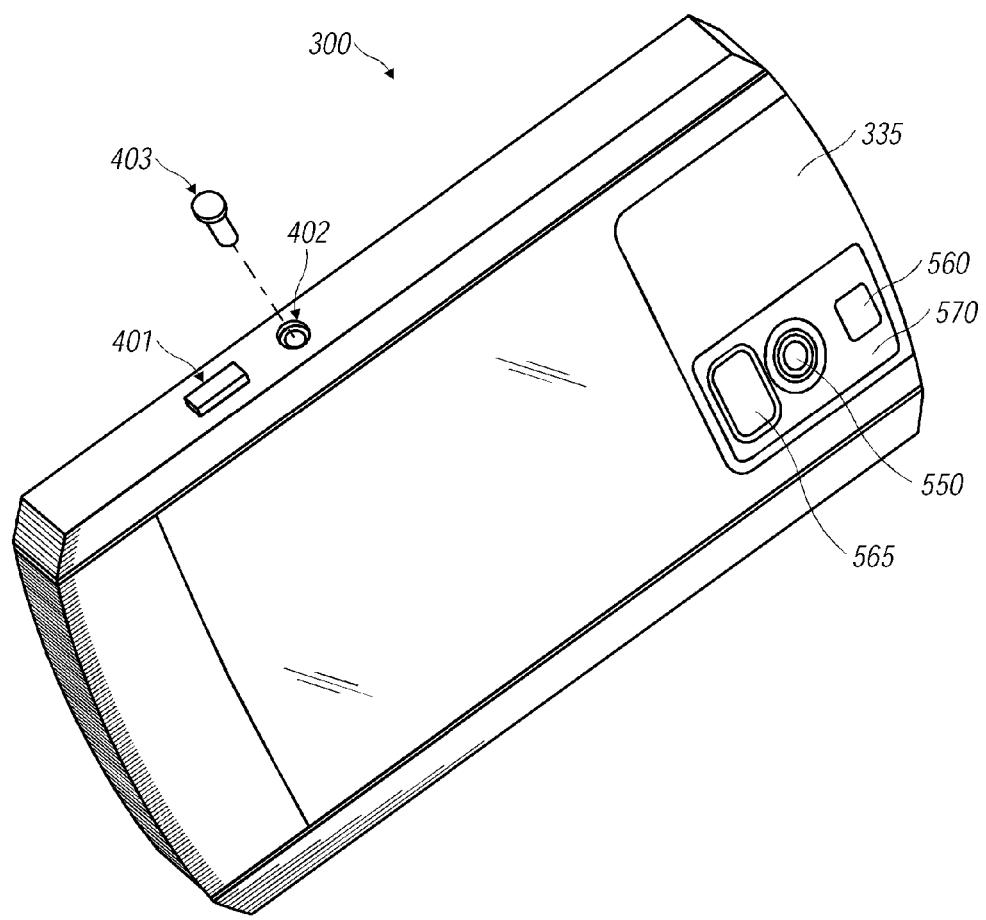
FIG. 21 is a perspective view of a backside of another exemplary handheld electronic device with a camera module installed and including a selective enablement pin.

The key itself can take many forms. One such form is exemplified by the pin 403 that has detectable physical characteristics, as shown in FIG. 21. A key-receiver 402 detects the physical characteristics of the pin 403, such as length, width, and any protrusions. For added security, protrusions can be included that are capable of engaging identifying sensors in or about the key-receiver 402. If the key-receiver 402 detects the correct physical characteristics, the camera assembly is placed into enabled mode until the pin 403 is removed.

Figure 22:
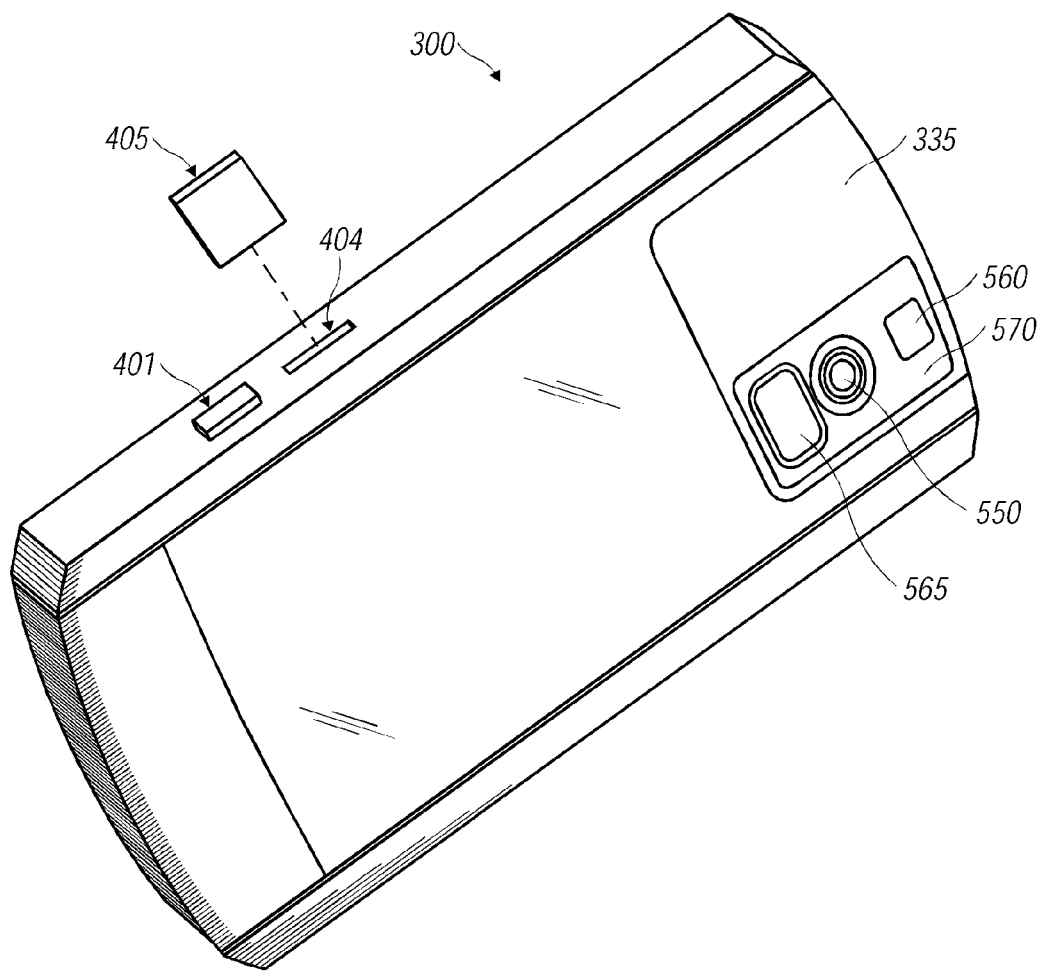
FIG. 22 is a similar view of another exemplary handheld electronic device, but instead of a pin, a selective enablement card is included.

In another embodiment, the key may take the form of a computer chip (not shown). The computer chip can be placed inside a card 405 or on the shaft of the pin 403 to be inserted into the key-receiver as depicted in FIGS. 21 and 22. The key-receiver contains a sensor for communication with the computer chip in order to verify that the computer chip has the prescribed authentication characteristics. If verification is successful, then the camera assembly is placed into the enabled mode until the computer chip is removed.

A selective disablement device 406 also allows for two modes of operation in the camera assembly 570, enabled mode and disabled mode. However, the selective disablement device 406 has an opposite function to the selective enablement device 403 in that a selective disablement device places the camera assembly 570 in disabled mode while a selective disablement device is connected to the camera. This type of disablement device may work by preventing the movement of the photo-initiating actuator 401 from the unactuated position to the actuated position or by covering the lens 550 of the camera so that no meaningful picture can be taken.

One embodiment of the selective disablement device is one that can physically block the photo-initiating actuator 401 from moving from the unactuated position to the actuated position. By preventing physical movement of the photo-initiating actuator 401, the actuator can not move from the unactuated position to the actuated position. This prevents an electrical signal from being sent to the processor 338 due to the photo-initiating actuator 401 moving from the unactuated position to the actuated position. Without the generation of the electrical signal, no photograph will be taken by the camera assembly 570.

Figure 23:
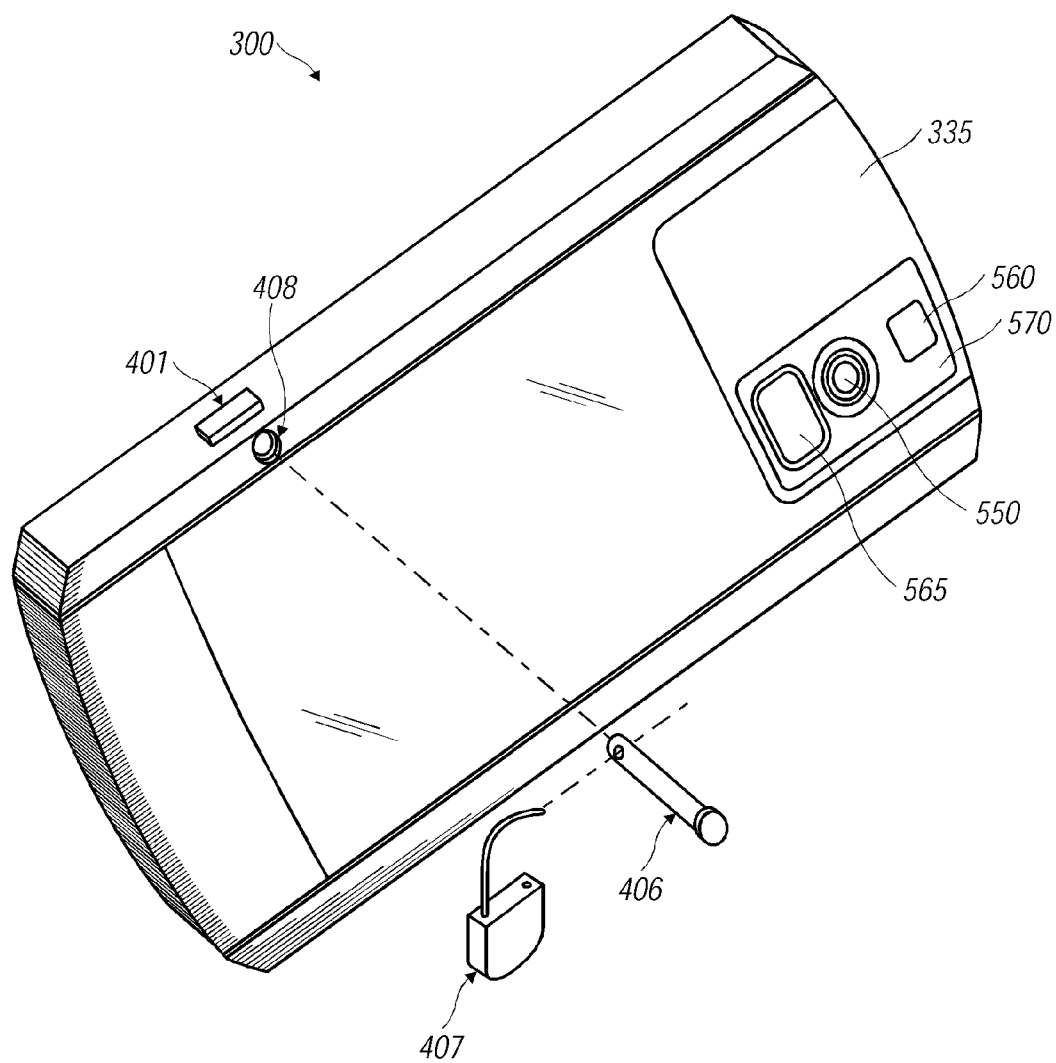
FIG. 23 is a perspective view of the backside of yet another exemplary handheld electronic device showing a selective disablement pin before insertion.
Figure 24:
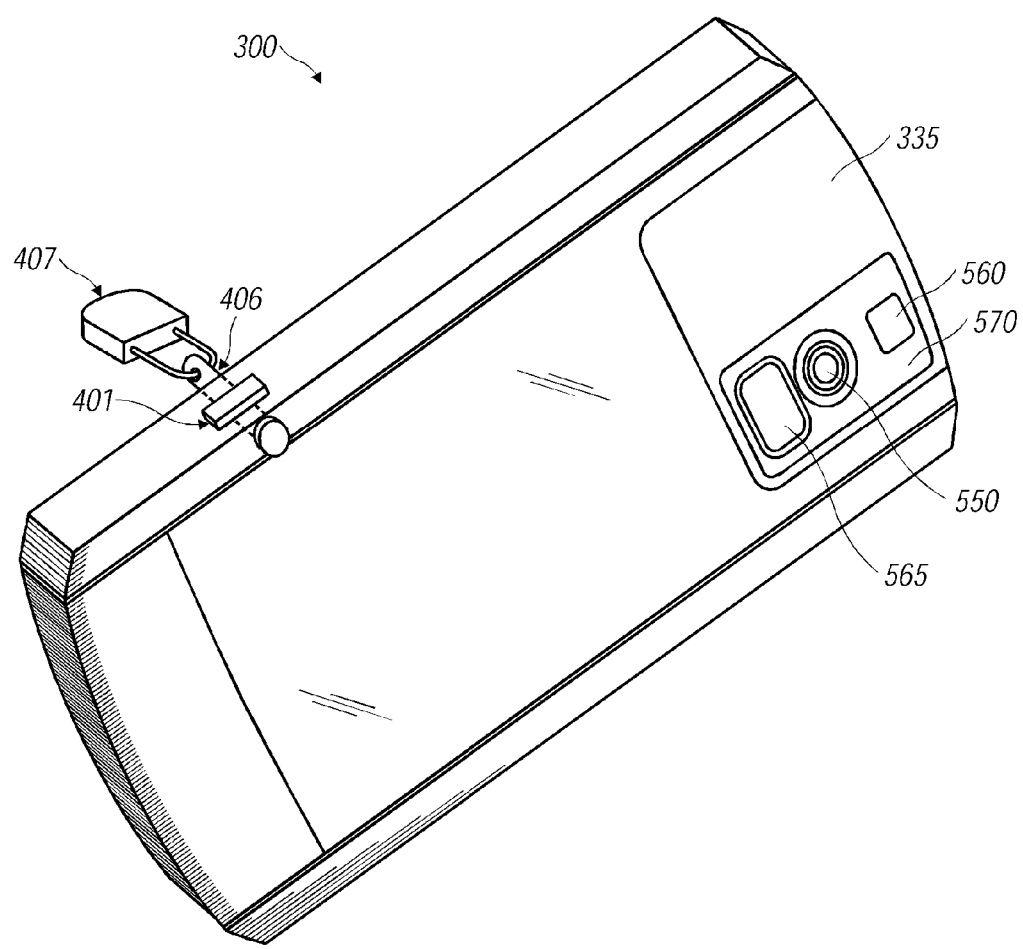
FIG. 24 shows the device of FIG. 23, but with the selective disablement pin inserted.

Such a selective disablement device could take the form of a pin 406 inserted into a pin receiver 408 on the communication device as shown in FIG. 23. The shaft of the inserted pin 406 creates a physical barrier to movement of the photo-initiating actuator 401. To prevent unauthorized removal of the pin 406, a tamper-evidencing security tag 407 can be attached to the pin 406 as shown in FIG. 24. If the pin 406 is removed, damaged, or disabled in any way, then that fact would be readily apparent to an observer of the security tag 407.

Another example of a selective disablement device that physically prevents the photo-initiating actuator 401 from moving is a tamper-evidencing lock (not shown). The lock connects through the communication device in such a way so that part of the lock physically prevents movement of the photo-initiating actuator 401. The lock would be configured so that if the lock has been picked, damaged, or disabled in any way, that fact would be readily apparent to an observer of the lock.

An additional exemplary embodiment of a selective disablement device is a lens cover. If the lens of the camera assembly is covered, then no light is able to reach the imaging sensor of the camera assembly. Hence, the only pictures that could be taken would be completely dark, effectively disabling any useful picture taking.

Figure 25:
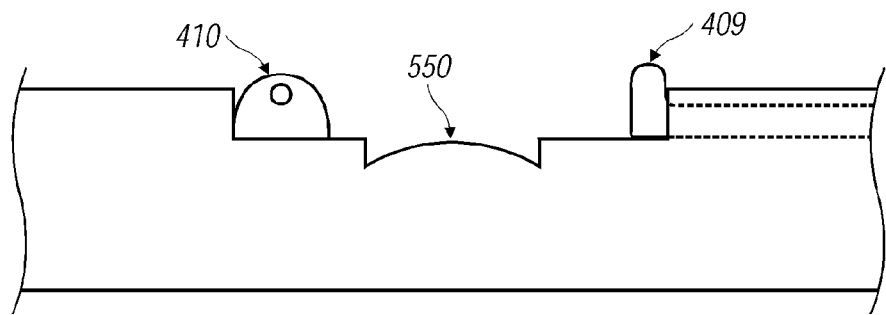
FIG. 25 is a side, partial cutaway view at the lens of a camera assembly on a handheld electronic device that includes a sliding lens cover that is shown in the open position.
Figure 26:
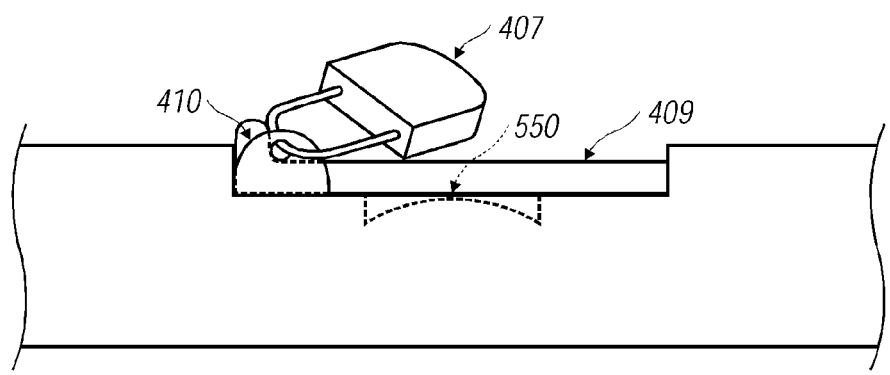
FIG. 26 is a side view similar to FIG. 25, but with the sliding lens cover in the closed position with a tamper-evident lock installed.

One type of a lens cover is a sliding lens cover 409 as exemplarily shown in FIGS. 25 and 26. The sliding lens cover 409 is normally physically attached to the camera assembly 570. It slides over the lens 550 to disable the camera assembly and slides off the lens 550 to enable the camera assembly. A tamper-evidencing security tag 407 may be used in order to ensure the sliding lens cover 409 remains over the lens 550, thus keeping the camera assembly in disabled mode. The security tag 407 can connect through an attachment point 410 on the hand held communication device 300 in such a way that the sliding lens cover 409 is prevented from moving relative to the handheld communication device 300 as shown in FIG. 26.

Instead of a lock, a pin could also be used. In this embodiment, the pin would pass through the attachment point on the handheld communication device 300 to prevent the movement of the sliding lens cover 409 relative to the communication device 300. To prevent unauthorized removal of the pin, a tamper-evidencing security tag 407 can be attached to the pin. If the pin is removed, damaged, or disabled in any way, then it will be readily apparent to an observer that the pin and/or security tag 407 has been tampered with.

The position determining means for ascertaining a present geographical position of the device utilizing satellite-derived information and determining whether the device is presently located in the restricted operating area based on comparison to geographical boundaries of the restricted operating area stored in memory. The position determining means for ascertaining the present geographical position is preferably based on the global positioning system (GPS). Other systems that function similarly are also described later.

The control means imposes the defined camera restriction on the device when it is determined that the device is presently located in the restricted area.

In another embodiment, a method for remotely implementing an administrative policy on a wireless handheld having an incorporated camera is presented. The method involves storing data at the wireless handheld communication device that defines geographical boundaries of a restricted operating area of the device; ascertaining a present geographical position of the device utilizing satellite-derived information and determining whether the device is presently located in the restricted operating area based on a comparison to the stored geographical boundaries of the restricted operating area; and imposing a camera restriction on the device when it is determined that the device is presently located in the restricted area. Additionally, the data defining the camera restrictions to be imposed can be stored on the wireless handheld communication device. These camera restrictions are to be imposed when the device is located in the restricted area. Furthermore, the wireless handheld communication device receives data that defines geographical boundaries of a restricted operating area of the device. The above described elements can be combined together to produce different variations of methods to restrict the operation of the camera.

As previously described, it is desirable for certain individuals or organizations to restrict the operation of a camera that is mounted on or connected to a handheld mobile communication device. Exemplarily embodiments of the handheld device 300 and associated components, camera 550, and communication with a satellite 520 can be seen in FIGS. 18, 1b, and 19. In a preferred embodiment, the digital camera 550 is restricted based upon the geographical location of the device. Data regarding the restricted operating area or zone 530 is stored on the device. This data is preferably received via a wireless communication network 319, as shown in FIG. 19. However, it is also possible that the data for the restricted zone 530 is received while the device 300 is connected to a cradle. This data preferably defines a set of geographical boundaries within which camera restriction is desired. This data delimiting the geographical boundaries is preferably defined in terms of coordinates. Other data may be used to define the geographical boundaries as is desired in order to effectively process the data received by the handheld 300 from a positioning system. Preferably, the position is determined via satellite data, but the position can also be determined using data received from the communication network 319 upon which the device 300 is operating.

As depicted in FIG. 19, the device 300 is capable of receiving data transmitted via satellite 520 to determine position. The satellite 520 is preferably a GPS satellite, yet in other embodiments the satellite 520 can be another type of satellite, such as a GLONASS (Global Orbiting Navigation Satellite System) satellite, equipped to transmit data to a receiver for determination of position information. The data transmitted by the satellite 520 relates to time information, which can be used by the processor 338 of a receiving device 300 to determine position. In order to obtain an accurate position determination, data from four different satellites is preferred while position information can be obtained if only three satellites are able to transmit data. Other positioning systems may use a similar or different satellite configuration requirement than the GPS system. One skilled in the art would be able to make the necessary adaptations to allow the device 300 to function with the appropriate satellite system. Additionally, other variants of GPS such as differential GPS and WAAS (Wide Area Augmentation System) allow for greater accuracy in position determination through the use of additional data. Preferably, the determination of the location of the device is made using a specially designed processor for position determination. This position information can be in turn relayed or transmitted to the main device processor 338 for display purposes or other control purposes.

Additionally, the location of a handheld communication device 300 can be determined by using the wireless network infrastructure 319. If the device 300 is in an area of coverage such that three transmitters of the wireless network can communicate with the device 300, a triangulation method of device location may be implemented. Other techniques for locating the handheld communication device 300 using communication network transmissions for position determination of the device are also considered within the scope of this disclosure and are easily appreciated by those persons skilled in these arts.

Once the position of the device 300 has been determined, its location in relation to the geographical boundaries of the restricted operating area 530 is determined. As exemplarily shown in FIG. 19, the device 300 is located within a restricted zone 530. In a preferred embodiment, a position determiner 337 is implemented to receive satellite-based information that defines a present geographical position of the device 300 and determine if the device 300 is located in the restricted area 530 based on a comparison to geographical boundaries of the restricted area 530 stored in memory. The information regarding the position of the device 300 is preferably processed by a specially designed circuit as previously described. Then, this data is used by the position determiner 337 to determine the location of the device 300 with respect to the restricted area/zone 530. The determination of the relative position of the device 300 can be made on a continuous basis or at predefined intervals in order to optimize battery life of the device 300. While the device 300 is located within the restricted area 530, a controller adapts the functionality of the camera based on the imposed camera restriction.

The camera restrictions are preferably set by an administrator and these restrictions can be aimed at different aspects or levels of functionality. One restriction would be complete disablement of the camera 550. Disablement of the camera 550 can be handled by restrictive software associated with the camera 550. When a user attempts to access the camera function, a message can be displayed on the screen 322 indicating to the user that the device 300 is inside a restricted area 530. In another embodiment, the restriction is a temporary disablement of the camera 550. This temporary disablement can be designed such that the camera 550 is disabled for a predetermined period of time. This arrangement can be used in situations in which the user is attending a meeting being held in a restricted area 530 for a certain period of time. Once the time elapses and the user will have presumably left the restricted meeting area, then the ability to use the camera 550 is allowed to return to its normal state of operation. This prevents the need for resending additional information over the wireless communication network 319 to allow camera 550 operation. For example, the predetermined time can be a set real time or an elapsed period of time. Another restriction that can be placed on the camera 550 is that a source-identifying watermark can be embedded in the digital image taken with the camera. This identifying watermark can include a device serial number, a telephone number associated with the device 300, carrier identification information, or the like so as to positively identify the device 300 and probable user associated with the picture. Other camera restrictions are possible such as prohibition of flash photography and limiting focal distance, among others.

As previously mentioned, the data defining the geographical boundaries is stored on the device 300. Preferably, this data is stored in the memory 324 of the device 300 which is electrically connected with the processor 338. The data defining the geographical restrictions is preferably transferred via the wireless communication network 319. The data defining the geographical restrictions and camera restrictions can be received by the device via the standard device receiver 312. In at least one embodiment, a configuration signal receiver processes configuration data that has been transmitted from an enterprise administrator. This configuration signal receiver can be adapted to function with the below described IT policy system.

The IT policy system presented herein is intended to serve as an exemplary implementation of an IT policy system. The description provided herein is designed to illustrate how the handheld communication device 300 can communicate with an IT policy server through a host system.

Figure 18:
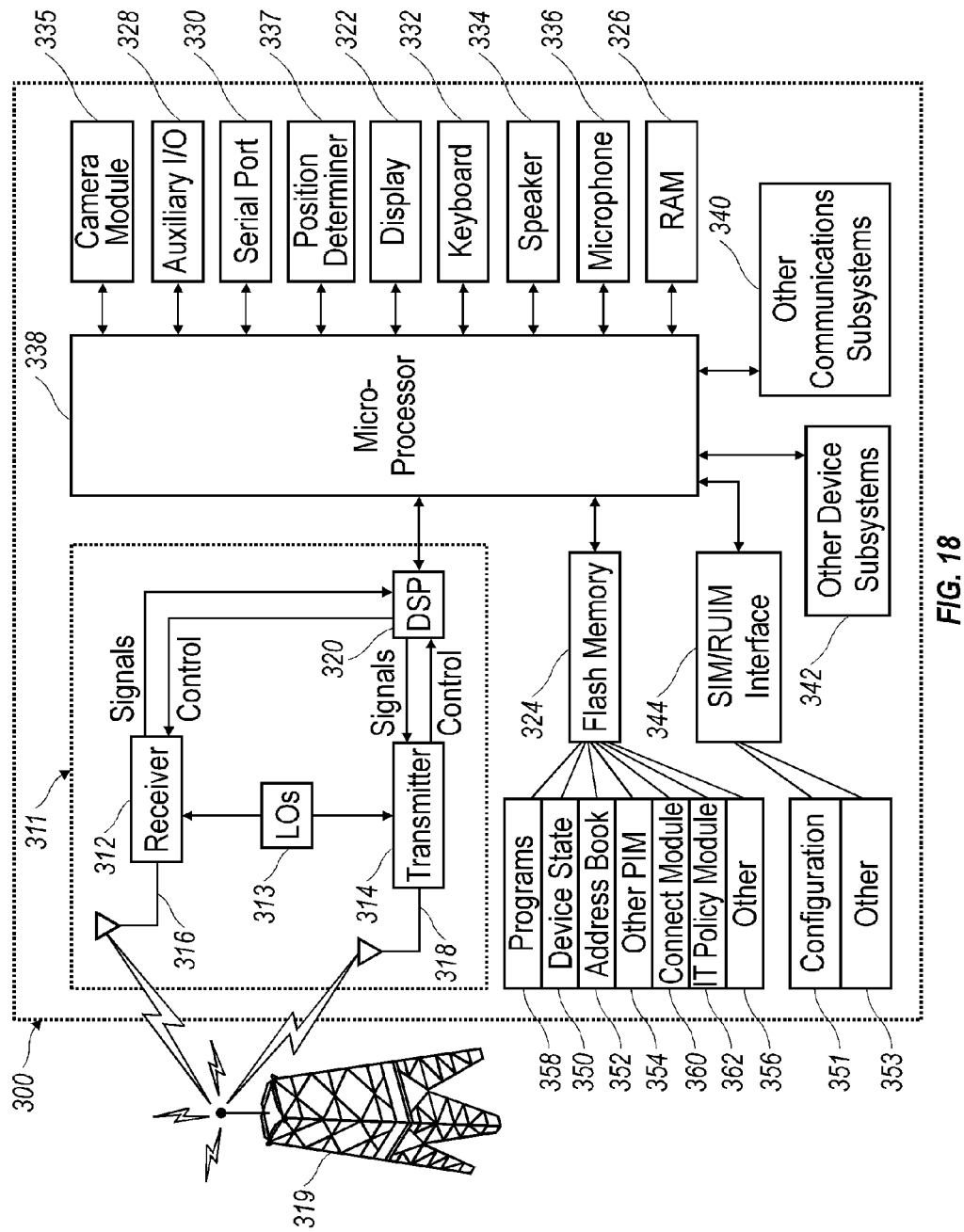
FIG. 18 is a block diagram representing a wireless handheld communication device interacting in a communication network.
Figure 19:
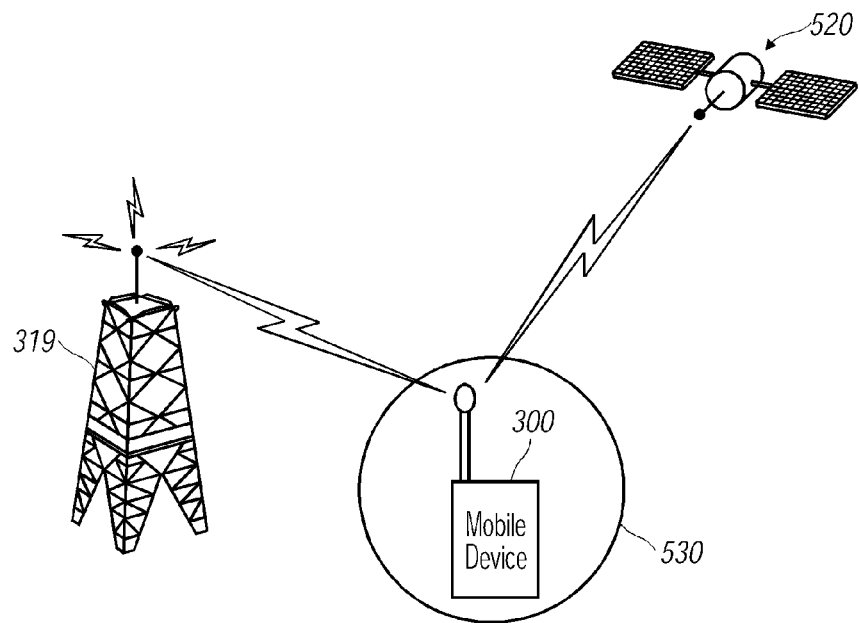
FIG. 19 illustrates an exemplary diagram showing the mobile device in communication with a communication network and a satellite.

The mobile device 300 includes a connect module 360, and an IT policy module 362, as shown in FIG. 18. The connect module 360 implements the communication protocols that are required for the mobile device 300 to communicate with the wireless infrastructure and any host system, such as an enterprise system, with which the mobile device 300 is authorized to interface. An example of a wireless infrastructure and an enterprise system is given in FIG. 4, which is described in more detail below.

The connect module 360 includes a set of APIs (Application Programming Interfaces) that can be integrated with the mobile device 300 to allow the mobile device 300 to use any number of services associated with the enterprise system. The connect module 360 allows the mobile device 300 to establish an end-to-end secure, authenticated communication pipe with the host system. A subset of applications for which access is provided by the connect module 360 can be used to pass IT policy commands from the host system to the mobile device 300. This can be done in a wireless or wired manner. These instructions can then be passed to the IT policy module 362 to modify the configuration of the device 300. Alternatively, in some cases, the IT policy update can also be done over a wired connection.

The IT policy module 362 receives IT policy data that encodes the IT policy. The IT policy module 362 then ensures that the IT policy data is authenticated by the mobile device 300. The IT policy data can then be stored in the flash memory 324 in its native form. After the IT policy data is stored, a global notification can be sent by the IT policy module 362 to all of the applications residing on the mobile device 300. Applications to which the IT policy pertains then respond by reading the IT policy data to look for IT policy rules that are applicable.

The IT policy module 362 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 362 can determine which applications are affected by the IT policy data and sends a notification to only those applications. In either of these cases, for applications that are not running at the time of the notification, the applications can call the parser or the IT policy module 362 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore, the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 362 sends an acknowledgement back to the host system to indicate that the IT policy data was received and successfully applied.

Figure 4:
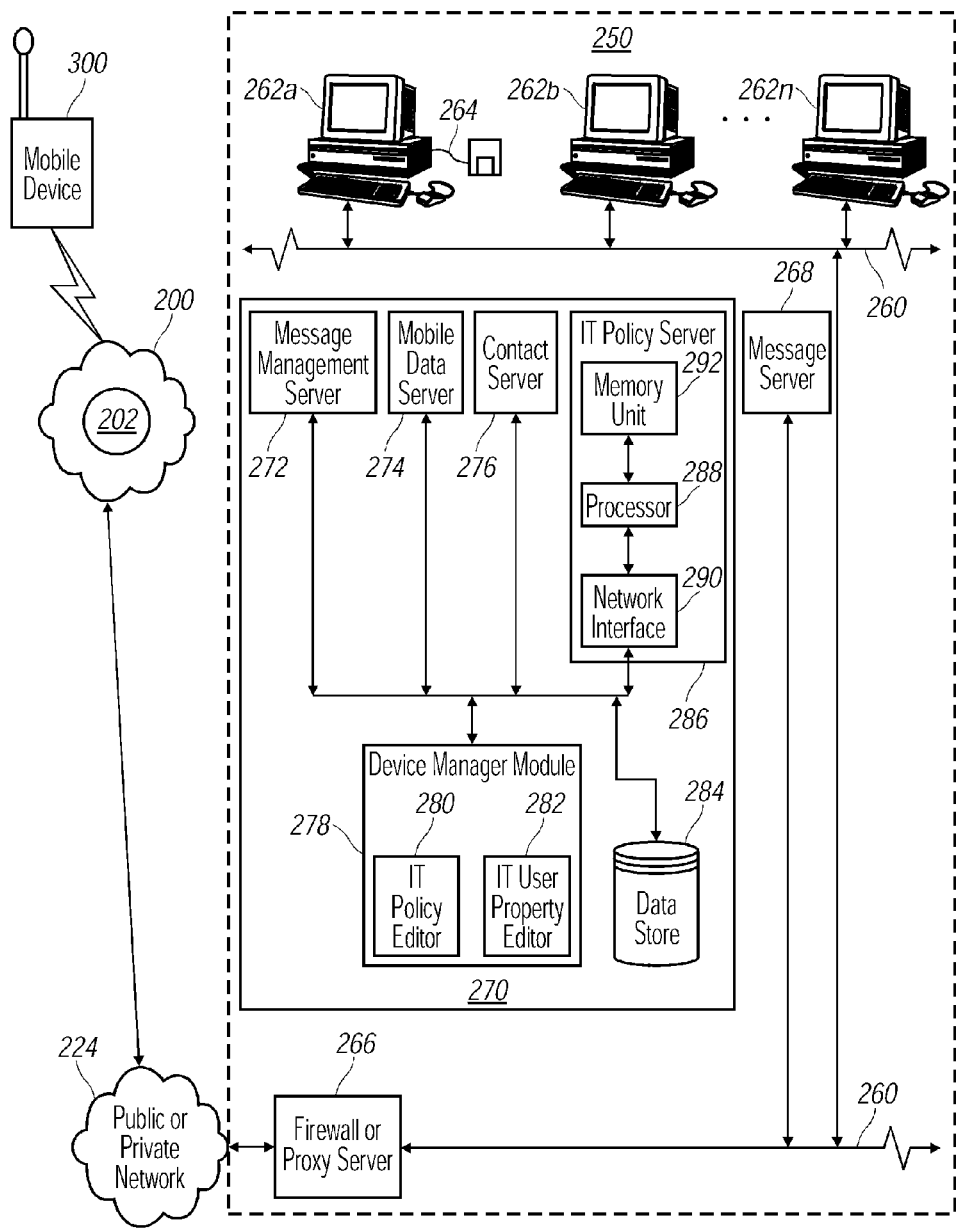
FIG. 4 is a block diagram illustrating components of a host system in an exemplary configuration in connection with a communication network and handheld communication device.

Referring now to FIG. 4, a block diagram is shown illustrating components of another exemplary configuration of a host system 250 that the mobile communication device 300 can communicate with in conjunction with the connect module 360. The host system 250 will typically be a corporate enterprise or other local area network (LAN), but may also be a home office computer or some other private system, for example. In the example shown in FIG. 4, the host system 250 is depicted as a LAN of an organization to which a user of the mobile communication device 300 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's mobile communication device 300 is situated on a LAN connection. The cradle 264 for the mobile communication device 300 can be coupled to the computer 262*a* by a serial or a Universal Serial Bus (USB) connection, for example. Other user computers 262*b*-262*n* are also situated on the network 260, and each may or may not be equipped with an accompanying cradle 264. The cradle 264 facilitates the loading of information (e.g. PIM data, private symmetric encryption keys to facilitate secure communications, geographical restrictions) from the user computer 262*a* to the mobile communication device 300, and may be particularly useful for bulk information updates often performed in initializing the mobile communication device 300 for use. The information downloaded to the mobile communication device 300 may include certificates used in the exchange of messages.

It will be understood by persons skilled in the art that the user computers 262*a*-262*n* will typically also be connected to other peripheral devices, such as printers and the like that are not shown in FIG. 4. Furthermore, only a subset of network components of the host system 250 are shown in FIG. 4, and it will be understood by persons skilled in the art that the host system 250 will comprise additional components that are not explicitly shown in FIG. 4 for this exemplary configuration. More generally, the host system 250 may represent a smaller part of a larger network of the organization, and may comprise different components and/or be arranged in different topologies than that shown in the exemplary embodiment of FIG. 4.

To facilitate the operation of the mobile communication device 300 and the wireless communication of messages and message-related data between the mobile communication device 300 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile communication device 300. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. A processor 288 controls the operation of the IT policy server 286 and executes functions related to the standardized IT policy as described below. The network interface 290 allows the IT policy server 286 to communicate with the various components of the host system 250 and the mobile devices 300. The memory unit 292 can store functions used in implementing the IT policy as well as related data. Those skilled in the art are familiar with the implementation of these various components. Other components may also be included as is well known to those skilled in the art. Further, in some implementations, the data store 284 can be part of any one of the servers.

In this exemplary embodiment, the mobile communication device 300 communicates with the host system 250 through a node 202 of the wireless network 200 and a shared network infrastructure 224, such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN (Virtual Private Network) router (not shown) to facilitate data exchange between the host system 250 and the mobile communication device 300. The wireless VPN router allows a VPN connection to be established directly through a specific wireless network to the mobile communication device 300. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile communication device 300 in this alternative implementation.

Messages intended for a user of the mobile communication device 300 are initially received by a message server 268 of the host system 250. Such messages may originate from any number of sources. For instance, a message may have been sent by a sender from the computer 262b within the host system 250, or from a different mobile device (not shown) connected to the wireless network 200 or a different wireless network. Additionally the message may have been sent from a different computing device, or other device capable of sending messages, via the shared network infrastructure 224, possibly through an application service provider (ASP) or Internet service provider (ISP).

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, with which the message server 268 communicates. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile communication device 300. Alternatively, the data store associated with the message server 268 can store all of the messages for the user of the mobile communication device 300 and only a smaller number of messages can be stored on the mobile communication device 300 to conserve device memory 324. For instance, the most recent messages (i.e. those received in the past two to three months for example) can be stored on the mobile communication device 300.

When operating the mobile communication device 300, the user may wish to have e-mail messages retrieved for delivery to the mobile communication device 300. The message application operating on the mobile communication device 300 may also request messages associated with the user's account from the message server 268. The message application may be configured (either by the user or by an administrator, possibly in accordance with an organization's IT policy) to make this request at the direction of the user, at some predefined time interval, or upon the occurrence of some predefined event. In some implementations, the mobile communication device 300 is assigned its own e-mail address, and messages addressed specifically to the mobile communication device 300 are automatically redirected to the mobile communication device 300 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile communication device 300. The message management server 272 also facilitates the handling of messages composed on the mobile communication device 300, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile communication device 300. The message management server 272 may also compress and encrypt new messages (e.g. using an encryption technique such as Data Encryption Standard (DES), Triple DES, or Advanced Encryption Standard (AES)) and push them to the mobile communication device 300 via the shared network infrastructure 224 and the wireless network 200. The message management server 272 may also receive messages composed on the mobile communication device 300 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the mobile communication device 300 can be defined (e.g. by an administrator in accordance with IT policy) and enforced by the message management server 272. Examples may include whether the mobile communication device 300 may receive encrypted and/or signed messages, minimum encryption key sizes, whether outgoing messages must be encrypted and/or signed, and whether copies of all secure messages sent from the mobile communication device 300 are to be sent to a pre-defined copy address. Additionally, restrictions can be placed on messages sent from the mobile communication device 300 limiting the ability to send pictures over the network 200.

The message management server 272 may also be adapted to provide other control functions, such as only pushing certain message information or pre-defined portions (e.g. "blocks") of a message stored on the message server 268 to the mobile communication device 300. For example, in some cases, when a message is initially retrieved by the mobile communication device 300 from the message server 268, the message management server 272 may push only the first part of a message to the mobile communication device 300, with the part being of a pre-defined size (e.g. 2 KB). The user can then request that more of the message be delivered in similar-sized blocks by the message management server 272 to the mobile communication device 300, possibly up to a maximum pre-defined message size. Accordingly, the message management server 272 facilitates better control over the type of data and the amount of data that is communicated to the mobile communication device 300, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile communication device 300. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Alternatively, in some embodiments, the IT policy editor 280, the IT user property editor 282 and the data store 284 can be the IT policy server 286. In some cases, the device manager module 278 can also be implemented on the IT policy server 286. The processor 288 of the IT policy server 286 can be used to perform the various steps of a method for providing IT policy data that is customizable on a per-user basis. The processor 288 can execute the IT Policy Editor 280 and IT User Property Editor 282. In some cases, the functionality of the editors 280, 282 can be provided by a single editor. In some cases, the memory unit 292 can provide the data store 284.

The device manager module 278 provides an IT administrator with a graphical user interface with which the IT administrator interacts to configure various settings for the mobile communication device 300. As mentioned, the IT administrator can use IT policy rules to define behaviors of certain applications on the mobile communication device 300 that are permitted such as phone, web browser or Instant Messenger use. The IT policy rules can also be used to set specific values for configuration settings that an organization requires on the mobile communication device 300 such as auto signature text, WLAN/VoIP/VPN configuration, security requirements (e.g. encryption algorithms, password rules, etc.), specifying themes or applications that are allowed to run on the mobile communication device 300, and the like.

Definitions of known supported IT policy rules can be distributed by way of bundling them with the messaging service software, or as a standalone update that can be applied to an IT policy table. Alternatively, and in addition to the distribution of proprietary rules, IT administrators can invoke the IT policy editor 280 to add or modify existing custom IT policy rules to be used by their own or third-party applications.

The above described IT policy system can effectively be used on communication devices 300, where the administrator wishes to prohibit certain features of the device such as camera functionality, BLUETOOTH® communications, Wi-Fi communications, and other functionality limitations as desired. Thus the system is capable of remotely implementing an administrative policy on the wireless handheld communication devices within the system. For example, the administrator can set rules using the IT policy editor 280 to impose restrictions on the operation of a camera if the device is within a restricted operating area. These restrictions are transmitted to the device 300 using the above described procedure or one that is similar. Once the communication is received by the IT policy module 362, the restrictions can be passed to the appropriate programs controlling the camera. By limiting these functionalities it is possible to provide a secure operating environment for the company and its IT infrastructure. The above described infrastructure for communicating the IT policy to the device is provided as an example and other systems for communicating such an IT policy are considered within the scope of this disclosure. Further details concerning the handheld communication device 300 along with another IT infrastructure is described below.

Figure 20:
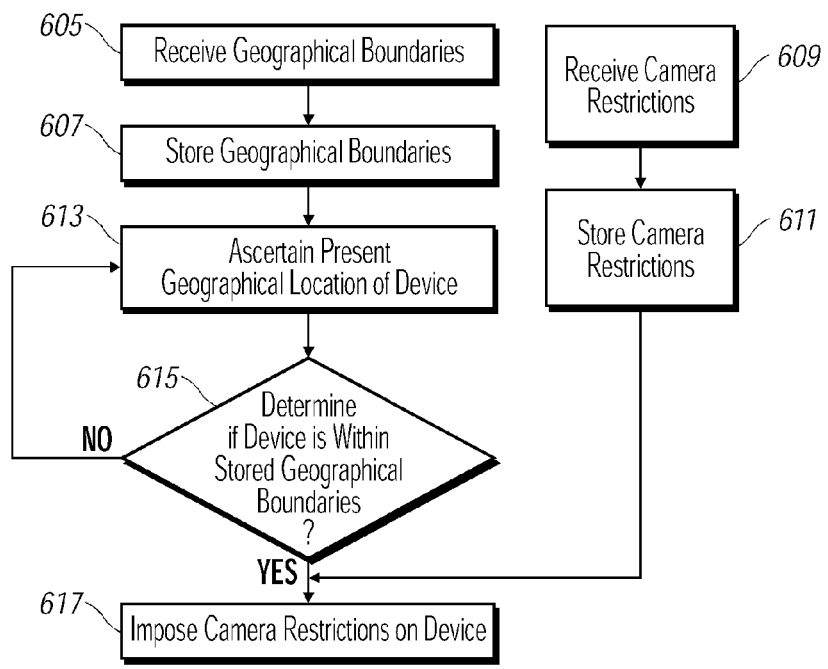
FIG. 20 is a flow chart illustrating an exemplary embodiment of a method for restricting operation of the camera on the handheld communication device.

Referring to FIG. 20, an exemplary flow chart of a method for imposing restrictions on the camera of the handheld communication device 300 is shown. These restrictions can be implemented remotely through an administrative policy using the above describe IT policy system. Geographical boundaries are transmitted to, and received at the device 300 (block 605). This data defining geographical boundaries are then stored on the device 300 (block 607). Data defining the restrictions to be imposed on the camera are preferably transmitted to the device 300 and received by the device 300 (block 609). In a preferred embodiment, the receipt of geographical boundaries and camera restrictions occurs at the same time based upon the transmission of the IT policy from the IT policy server (not shown). These camera restrictions are stored for later use (block 611).

The present geographical position/location of the device 300 is ascertained using satellite-derived information (block 613). Then a determination is made whether the device 300 is located within the stored geographical boundaries (block 615). Once it has been determined that the device 300 is within one of the stored geographical boundaries, then the appropriate camera restrictions are imposed (block 617). However, if the device 300 is not within the stored geographical boundary the present location of the device 300 is monitored. Likewise once the restriction has been imposed on the device 300, the position of the device is evaluated to determine when the device has left the restricted area. The camera restrictions can be one of the above described restrictions. Furthermore, while the storage of the restrictions has been described above, in other embodiments the camera restriction is a default restriction and only the determination of the location of the device 300 is required. The geographical as well as camera restrictions can be predetermined (prerecorded) or transmitted to the device 300 using one of the systems described herein.

When designing a handheld communication device 300, other considerations are important as well. A potential problem is presented by the small size of the device 300 in that there is limited exterior surface area for the inclusion of user input and device output features. This is especially true for the "prime real estate" of the front face of the device, where it is most advantageous to include a display screen 322 that outputs information to the user. The display screen 322 is preferably located above a keyboard 332, which is utilized for data entry into the device 300 by the user. If the screen 322 is provided below the keyboard 332, a problem occurs in being able to see the screen 322 while inputting data. Therefore it is preferred that the display screen 322 be above the input area, thereby solving the problem by assuring that the hands and fingers do not block the view of the screen 322 during data entry periods.

To facilitate textual data entry, an alphabetic keyboard is provided. In one version, a full alphabetic keyboard is utilized in which there is one key per letter. This is preferred by some users because it can be arranged to resemble a standard keyboard with which they are most familiar. In this regard, the associated letters can be advantageously organized in QWERTY, QWERTZ, AZERTY or Dvorak layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith. This means that fewer keys can be included which makes it possible for those fewer keys to each be larger than in the instance when a full keyboard is provided on a similarly dimensioned device 300. Some users will prefer the solution of the larger keys over the smaller ones, but it is necessary that software or hardware solutions be provided in order to discriminate which of the several associated letters the user intends based on a particular key actuation; a problem the full keyboard avoids. Preferably, this character discrimination is accomplished utilizing disambiguation software accommodated within the device 300. As with the other software programs embodied within the device 300, a memory and microprocessor are provided within the body of the handheld unit 300 for receiving, storing, processing, and outputting data during use. Therefore, the problem of needing a textual data input means is solved by the provision of either a full or reduced alphabetic keyboard on the presently disclosed handheld electronic device 300.

Keys, typically of a push-button or push-pad nature, perform well as data entry devices but present problems to the user when they must also be used to affect navigational control over a screen-cursor. In order to solve this problem the present handheld electronic device 300 preferably includes an auxiliary input 328 that acts as a cursor navigational tool and which is also exteriorly located upon the front face of the device 300, as shown in FIG. 1*a*. Its front face location is particularly advantageous because it makes the tool easily thumb-actuable like the keys of the keyboard 332. A particularly usable embodiment, the navigational tool is a trackball 150 which is easily utilized to instruct two-dimensional screen cursor movement in substantially any direction, as well as act as an actuator when the ball of the trackball 150 is depressible like a button. The placement of the trackball 150 is preferably above the keyboard 332 and below the display screen 322; here, it avoids interference during keyboarding and does not block the user's view of the display screen 322 during use.

Preferably, a row 9 of function keys is provided between the display 322 and the keyboard 332. This row 9 of function keys preferably is aligned together with the navigation input device 328, which is preferably a trackball 150. The alignment of these keys allows the user an intuitive location for functions associated with navigation on the display screen 322 of the device 300. Some of the typical functions that might be provided are described below, but these function keys can be assigned different functions by a manufacturer. Additionally, while the keys are preferably assigned fixed functions, in some embodiments the functions may be user programmable. The call key 6 located on the left end of the row 9 is used to place or answer voice calls. Next, the menu key 5 is used to allow a user to pull up or display a menu on the screen of the device. This menu can be a full menu if a menu is already presented on the screen or a short menu with selections shown for the mostly likely choices of the user. Then, the trackball 150 is provided for navigation on the screen 322 of device 300. The trackball 150 is rotatable, allowing navigation of a cursor on the display screen 322 in various directions including up, down, left, right, and any combination thereof. Furthermore, the ball is depressible. When the ball is depressed, a selection is made based upon the current location of the cursor. Thus if the cursor is located over a given program icon, that program will be launched. Likewise, if the menu is shown and the cursor is over a particular item on the menu and the ball is depressed selection of that menu item will be made. Next, a back key 7 is provided, and this key 7 is capable of navigating to a previously displayed menu, selection, or device state. Thus, if the e-mail program is open and a message is displayed, pressing the back key 7 will cause the display to return to the general e-mail program listing all messages. If the back key 7 is further depressed, then display returns to a home screen or the interface from which the user selected the e-mail program. This back key 7 can be used until the user interface shown on the display screen 322 returns to a default state. Users can relate this to the functionality typically associated with an escape key as well, such that the current selection is cancelled and the previous state is returned. By locating the back key 7 next to the trackball 150, the user can make selections and cancel selections using a proximately located set of keys. On the right end of the row 9, a disconnect key 8 is provided enabling the user to terminate calls or otherwise disconnect from a voice communication. Additional function keys can be provided on the edges of the device such as buttons 130, 131, 132, 133, and 401 shown in FIG. 3. These function keys can be used to provide buttons to control volume, specific program selection, camera module activation, scrolling, or other functionality as desired by the manufacturer or user of the device 300.

In some configurations, the handheld electronic device 300 may be standalone in that it is not connectable to the "outside world." One example would be a PDA that stores such things as calendars and contact information, but is not capable of synchronizing or communicating with other devices. In most situations such isolation will be detrimentally viewed in that at least synchronization is a highly desired characteristic of handheld devices 300 today. Moreover, the utility of the device 300 is significantly enhanced when connectable within a system, and particularly when connectable on a wireless basis in a system in which both voice and text messaging are accommodated.

Further aspects of the environments, devices and methods of employment described hereinabove are expanded upon in the following details. An exemplary embodiment of the handheld electronic device 300 as shown in FIG. 1 can be cradled in the palm of a user's hand. The size of the device 300 is such that a user is capable of operating the device 300 using the same hand that is holding the device 300. In a preferred embodiment, the user is capable of actuating all features of the device 300 using the thumb of the cradling hand. While in other embodiments, features may require the use of more than just the thumb of the cradling hand. The preferred embodiment of the handheld device 300 features a keyboard 332 on the face of the device 300, which is actuable by the thumb of the hand cradling the device 300. The user may also hold the device 300 in such a manner to enable two thumb typing on the device 300. Furthermore, the user may use fingers rather than thumbs to actuate the keys on the device 300. In order to accommodate palm-cradling of the device 300 by the average person, it is longer (height as shown in FIG. 1) than it is wide, and the width is preferably between approximately two and three inches, but by no means limited to such dimensions.

The handheld electronic device 300 includes an input portion and an output display portion. The output display portion can be a display screen 322, such as an LCD or other similar display device.

The input portion includes a plurality of keys that can be of a physical nature such as actuable buttons or they can be of a software nature, typically constituted by virtual representations of physical keys on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen 322, a current indicia for the key may be temporarily shown nearby the key on the screen 322.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Thus, the desired character, command or function is obtained by depressing the physical key corresponding to the character, command or function displayed at a corresponding position on the display screen 322, rather than touching the display screen 322. To aid the user, indicia for the characters, commands and/or functions most frequently used are preferably positioned on the physical keys and/or on the area around or between the physical keys. In this manner, the user can more readily associate the correct physical key with the character, command or function displayed on the display screen 322.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

Figure 5:
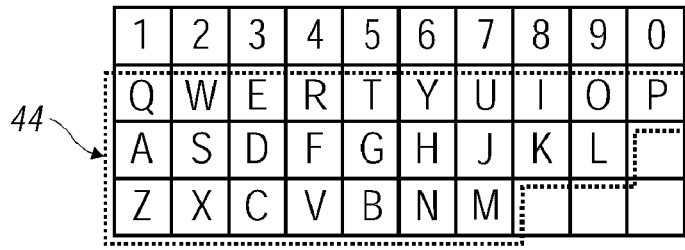
FIG. 5 illustrates an exemplary QWERTY keyboard layout.

The QWERTY keyboard layout is the standard English-language alphabetic key arrangement 44 (see FIG. 5). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878.

Figure 6:
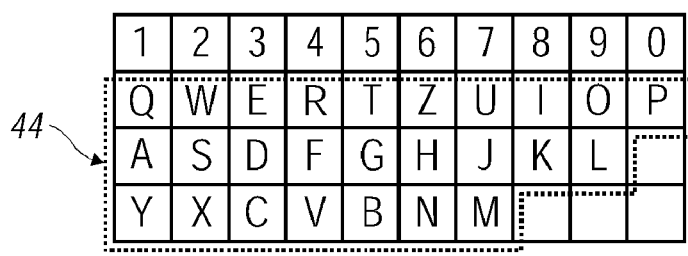
FIG. 6 illustrates an exemplary QWERTZ keyboard layout.

The QWERTZ keyboard layout is normally used in German-speaking regions. This alphabetic key arrangement 44 is shown in FIG. 6. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 7:
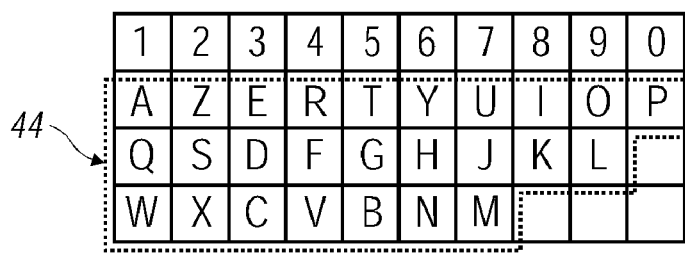
FIG. 7 illustrates an exemplary AZERTY keyboard layout.

The AZERTY keyboard layout is normally used in French-speaking regions. This alphabetic key arrangement 44 is shown in FIG. 7. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

The Dvorak keyboard layout was designed in the 1930s by August Dvorak and William Dealey. This alphabetic key arrangement 44 is shown in FIG. 8. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 5-8 where the numbers 1-9 and 0 are positioned above the alphabetic keys. In another known numeric key arrangement, numbers share keys with the alphabetic characters, such as the top row of the QWERTY keyboard. Yet another exemplary numeric key arrangement is shown in FIG. 9, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a known "ten-key" computer keyboard keypad. Additionally, a numeric phone key arrangement 42 is also known, as shown in FIG. 10.

As shown in FIG. 10, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key, as known by those of skill in the art.

It is desirable for handheld electronic devices 300 to include a combined text-entry keyboard and a telephony keyboard. Examples of such mobile communication devices include mobile stations, cellular telephones, wireless personal digital assistants (PDAs), two-way paging devices, and others. Various keyboards are used with such devices depending in part on the physical size of the handheld electronic device 300. Some of these are termed full keyboard, reduced keyboard, and phone key pads.

In embodiments of a handheld electronic device 300 having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

Figure 12:
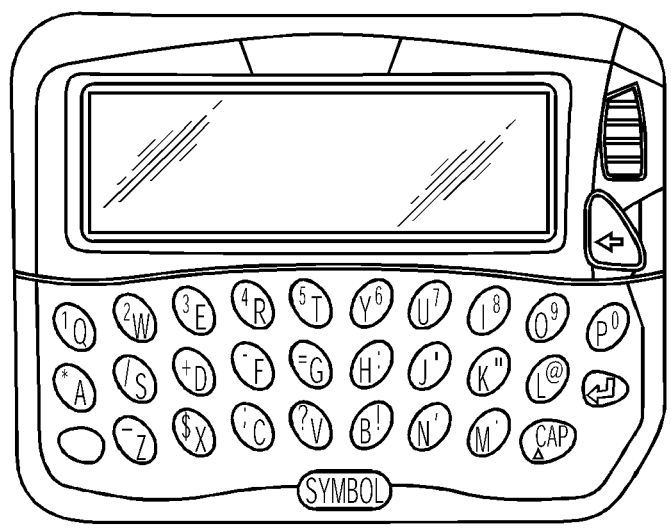
FIG. 12 is a front view of an exemplary handheld electronic device including a full QWERTY keyboard.
Figure 13:
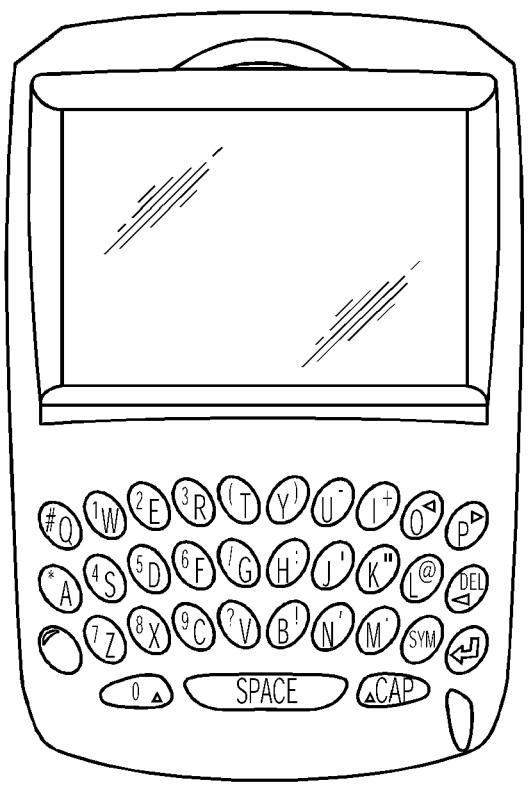
FIG. 13 is a front view of another exemplary handheld electronic device including a full QWERTY keyboard.

One device that uses a full keyboard for alphabetic characters and incorporates a combined numeric keyboard is shown in FIG. 12. In this device, numeric characters share keys with alphabetic characters on the top row of the QWERTY keyboard. Another device that incorporates a combined alphabetic/numeric keyboard is shown in FIG. 13. This device utilizes numeric characters in a numeric phone key arrangement consistent with the ITU Standard E.161, as shown in FIG. 10. The numeric characters share keys with alphabetic characters on the left side of the keyboard.

In order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types of handheld electronic device 300 to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage.

The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "text-on-nine-keys" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Figure 14:
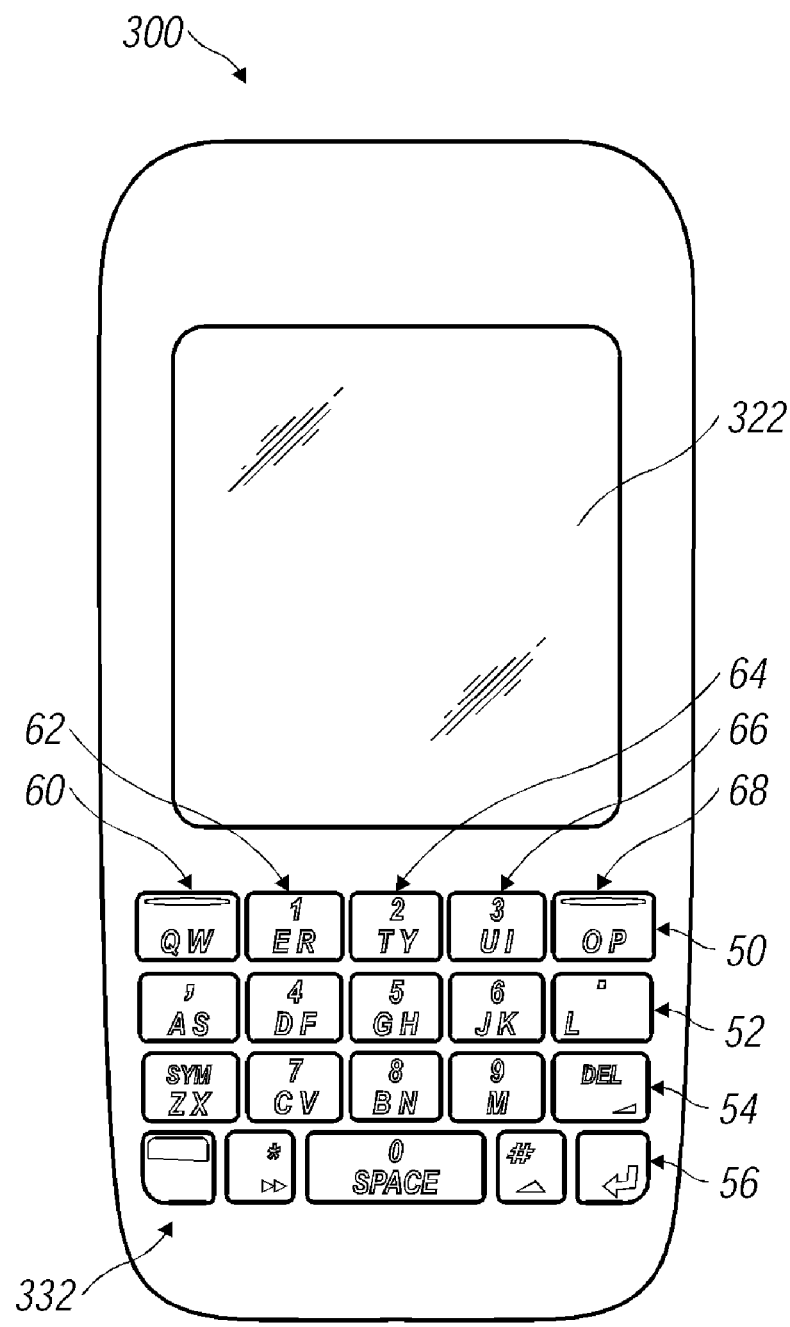
FIG. 14 is a front view of an exemplary handheld electronic device including a reduced QWERTY keyboard.

FIG. 14 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. The four rows include a first row 50, a second row 52, a third row 54, and a fourth row 56. The five columns include a first column 60, a second column 62, a third column 64, a fourth column 66, and a fifth column 68. Each of the keys in the first row 50, second row 52, and third row 54 is uniformly sized while the keys in the fourth, bottom row 56 have different sizes relative to one another and to the keys in the first three rows 50, 52, 54. The rows and columns are straight, although the keys in the fourth row 56 do not align completely with the columns because of their differing sizes. The columns substantially align with the longitudinal axis x-x of the device 300.

Figure 15:
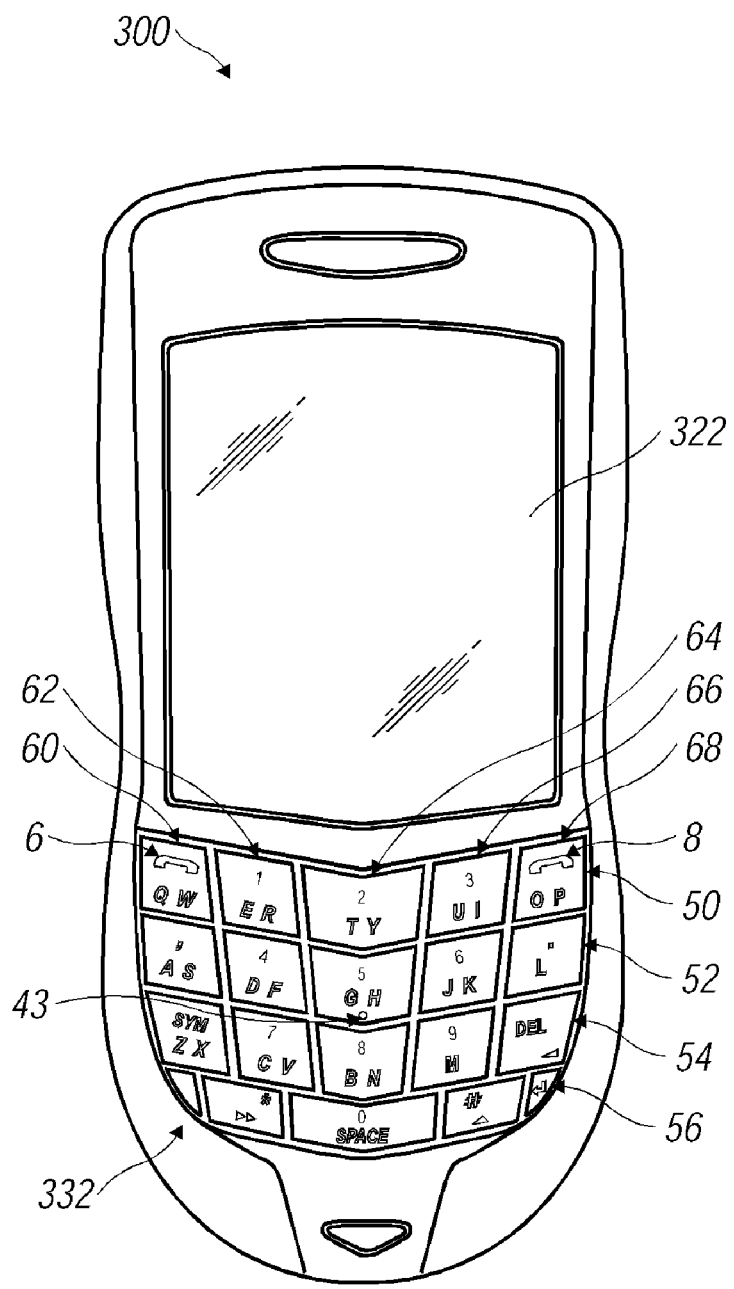
FIG. 15 is an elevational view of the front face of another exemplary handheld electronic device including a reduced QWERTY keyboard.
Figure 16:
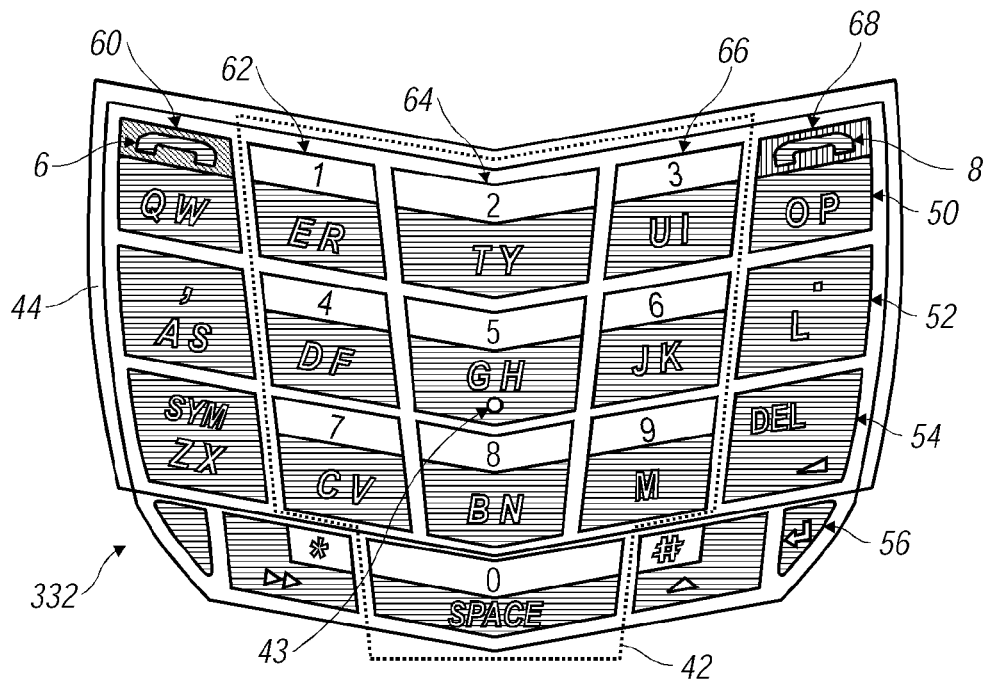
FIG. 16 is a detail view of the reduced QWERTY keyboard of device of FIG. 15.

FIG. 15 shows a handheld electronic device 300 that has an example physical keyboard array of twenty keys, with five columns and four rows. A detailed view of the keyboard 332 is presented in FIG. 16. Fourteen keys on the keyboard 332 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement.

In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 332 includes a "send" key 6 and an "end" key 8. The "send" key 6 is positioned in the upper left corner of the keyboard 332 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 17:
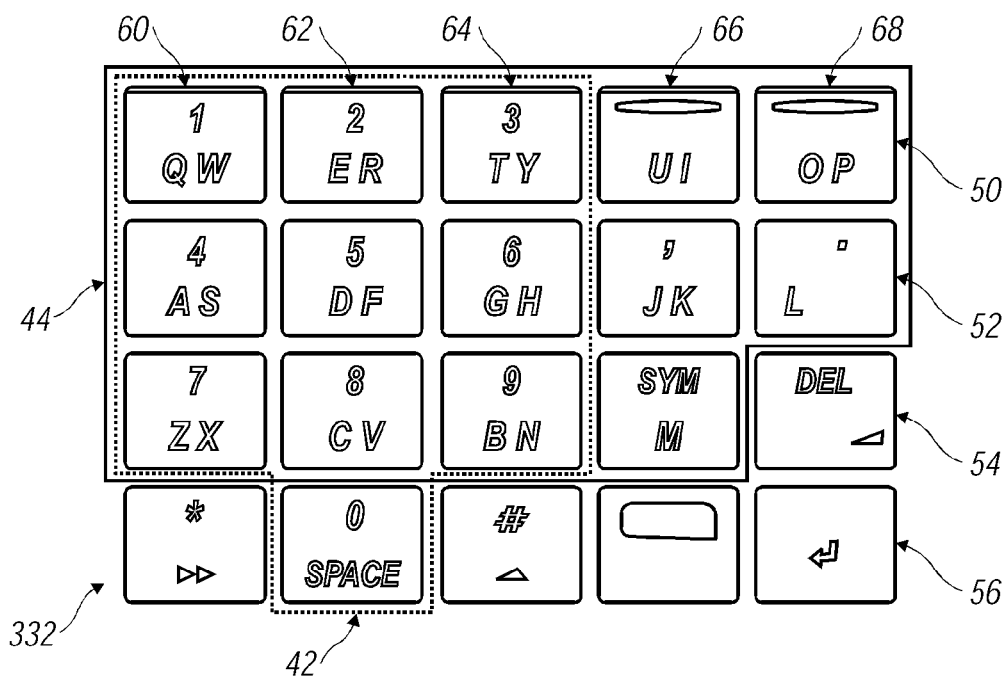
FIG. 17 is a detail view of an alternative reduced QWERTY keyboard.

FIG. 17 shows a similar format for the reduced QWERTY arrangement of alphabetic characters 44 as presented in FIG. 14, but the numeric phone key arrangement 42 is positioned in the first 60, second 62, and third 64 columns instead of being centered on the keyboard 332. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK/,", and "L/.". The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices 300 having a phone key pad also typically include alphabetic key arrangements overlaying or coinciding with the numeric keys as shown in FIG. 11. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 10 (no alphabetic letters) and 11 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

The table below identifies the alphabetic characters associated with each number for some other phone keypad conventions.

| | | | Mobile Phone Keypad | | |
|---|---|---|---|---|---|
| Number on Key | ITU E.161 | Australia | #1 | #11 (Europe) | #111 (Europe) |
| 1 | | QZ | | ABC | ABC |
| 2 | ABC | ABC | ABC | DEF | DEF |
| 3 | DEF | DEF | DEF | GHI | GHI |
| 4 | GHI | GHI | GHI | JKL | JKL |
| 5 | JKL | JKL | JKL | MNO | MNO |
| 6 | MNO | MNO | MN | PQR | PQR |
| 7 | PQRS | PRS | PRS | STU | STU |
| 8 | TUV | TUV | TUV | ŮVW | VWX |
| 9 | WXYZ | WXY | WXY | XYZ | YZ |
| 0 | | | OQZ | | |

It should also be appreciated that other alphabetic character and number combinations can be used beyond those identified above when deemed useful to a particular application.

As noted earlier, multi-tap software has been in use for a number of years permitting users to enter text using a conventional telephone key pad such as specified under ITU E 1.161 or on a touch screen display, among other devices. Multi-tap requires a user to press a key a varying number of times, generally within a limited period of time, to input a specific letter associated with the particular key, thereby spelling the desired words of the message. A related method is the long tap method, where a user depresses the key until the desired character appears on the display.

Figure 1B:
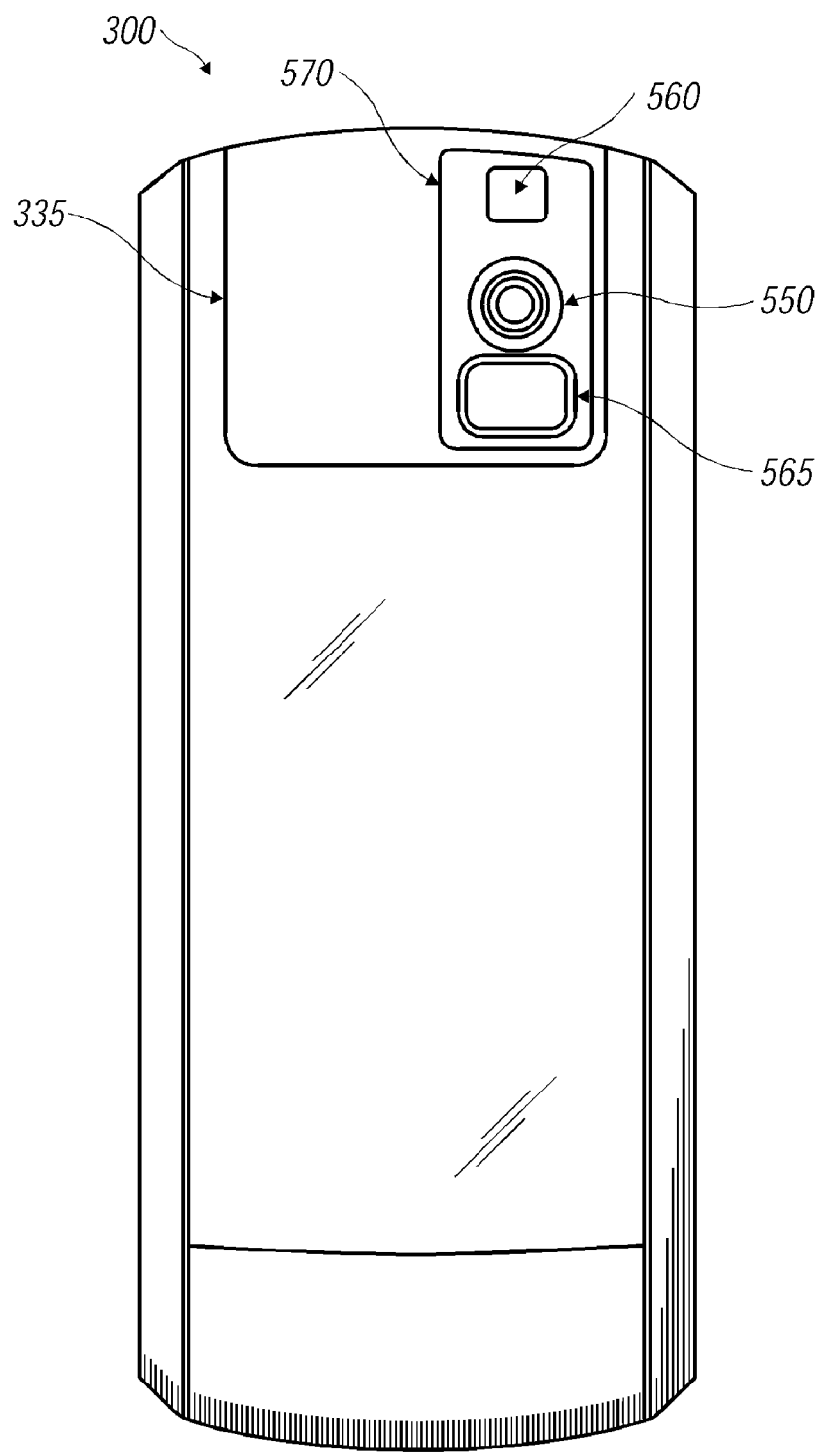
FIG. 1b is an elevational rear view of a handheld communication device showing an integrated camera assembly.

As shown in FIG. 1b, a camera 550 mounted on the exterior surface of the handheld electronic device 300 provides an additional means for input to the device 300. The camera 550 can be controlled by the administrative security policy. The camera and the device are integrated, with the lens preferably located on the rear side of the device. Situated next to the lens is a flash 560 capable of producing a light source at distances of at least one meter. The lens is protected from scratches by a protective covering. Additionally, the lens, protective covering, and image sensor are strong enough to resist mechanical forces associated with normal use of a portable electronic device. Examples of such forces include squeezing the device in the hand or dropping the device. Also, situated next to the camera 550 is a reflective surface 565 which enables a user to appropriately aim the camera 550 for image acquisition. The camera 550, reflective surface 565, and the flash 560 are part of the camera assembly 570. This camera assembly 570 is further connected to the camera module 335.

The camera 550 is capable of taking still images or video images, and preferably recording the accompanying audio. The display 322 can show images up to ten frames per second while the camera application is running. The focus range of the camera 550 is preferably from 10 cm (or nearer) to infinity. The camera 550 also contains a digital zoom function to magnify the image up to five times.

The handheld electronic device 300 contains a dedicated hard key key 401 (shown in FIG. 3) for initiating the taking of pictures, but the hard key can also be programmed for additional uses. By pressing the dedicated hard key or selecting a corresponding on-screen menu option, the camera will be enabled and the camera application will be launched. An additional depression of the dedicated hard key results in image acquisition (taking a picture).

After the picture is taken, the image is displayed on the device's display screen 322. The display 322 shows the picture along with a set of options from which the user may select. Options can include, but are not limited to: discarding/deleting the picture, saving the picture to the device memory, saving the picture to removable memory, setting the picture as the display background, associating the picture with a caller ID contact, or sending the picture wirelessly. Examples of wireless transmission methods include MMS (Multimedia Messaging Service), E-mail, or Messenger Service. If the user decides to save the picture, the picture can be stored into either fixed or removable memory. In a device 300 enabled to send e-mail messages, one of the above described options includes directly attaching the image to an e-mail message once the picture has been taken and displayed on the screen 322. This enables a user of the device to bypass the steps of saving the image and then later attaching the image.

While the camera application is running, the device 300 is capable of performing other non-camera functions, such as receiving e-mail messages and phone calls. After a predetermined amount of inactivity while in the camera application, the camera and display 322 will enter a sleep mode where the memory stores the current program location, but the power being supplied to the display 322 and camera is no longer provided.

In addition to facilitating picture taking, the camera application allows users to determine certain settings for the camera and the pictures to be taken. One option enables the display screen 322 to zoom in and out of the picture displayed on it. Another option permits the picture to be adapted to different image resolution sizes. Typical resolution sizes in pixels are: 160×120, 320×240, 640×480, 1024×768, 1M, 1.3M, or 2M. One such image resolution size is preferably set as the default image resolution size. Additionally, image quality adjustments can be used to adjust the image acquisition by the camera. Some examples of image qualities include normal, fine, and superfine, with one being preferably set as the default setting. Furthermore, timers and flash settings can be implemented in the image acquisition routine. The flash preferably is set to automatic, but can be adjusted to on or off modes of operation. Also, the camera module 335 and corresponding software can adjust the white balance. The adjustment of white balance can either be directly or through a series of preset options including automatic, sunny, cloudy, indoor, night, tungsten, and fluorescent. Preferably, the default for the white balance control is the preset option for automatic.

The user interface in at least one embodiment generates shutter sounds that are emitted by the device 300 when a picture is taken, purely as a familiar indicator to the user that an image has been acquired. Likewise, an option for the user to access stored pictures is provided through the user interface along with an option to add a date and/or a time stamp to a picture when it is taken. This information can further be controlled by an administrator with rights to control the IT security settings for the device.

Pictures taken by the camera will be preferably stored in the flash memory 324 of the handheld electronic device 300. The amount of memory used by the handheld electronic device 300 to store pictures should be at least 10 MB, with the actual amount set by the user. When the user is setting the amount of memory storage, the display should show approximately how many pictures the user can store at that setting based on the current resolution setting. When the storage limit is reached, the user is warned that the memory storage is full. However, if the handheld electronic device 300 is equipped with a removable storage device, the user can elect to store the pictures onto the removable storage instead of the flash memory 324.

In at least one embodiment, the images are saved in JPEG format with the following EXIF metadata information support: manufacturer/make, model, firmware version, orientation, x & y resolution, resolution unit, date & time, YCbCr positioning, component configuration, date/time original, EXIF color space, pixel X & Y dimension. Additionally, the metadata information can contain location information indicating the geographical location that the picture was taken. Furthermore, identification information can also be associated with the picture relating to the device or user can be stored in the metadata.

To facilitate management of stored pictures, a picture application can be provided as part of the device's software. The picture application can be run directly by the user or can be run automatically for a predetermined time after a picture is taken. The picture application gives users a number of options to manage their pictures. One option allows for a picture to be renamed or deleted. Another option allows the details of a selected picture to be viewed. Details of a selected picture could include name, size, type, resolution, and capture date/time. Another option allows for the user to set a selected picture as the background image for the handheld communication device 300. Yet another option allows for a selected picture to be designated as a caller ID image. Still another option allows for changing the order of the pictures to be shown on the display screen 322. Another option to edit pictures includes the ability to crop an existing image. Furthermore, another option allows the user to group selected pictures into a photo album. The photo albums should allow for viewing by slideshow. The movement of pictures through the slideshow may be controlled manually or automatically with preset transitions. Examples of automatic preset transitions could include 1s, 2s, or 5s. The default transition is manual. The slideshow can also be set to loop continuously. While the slideshow is running, the display 322 will not turn off based on user inactivity.

Another IT infrastructure example in which the handheld communication device 300 can operate is described below. The description given below provides one example of a system of sending and receiving messages. Other systems are known and this is provided as merely an example of a possible way in which the device can communicate with additional systems.

Figure 2:
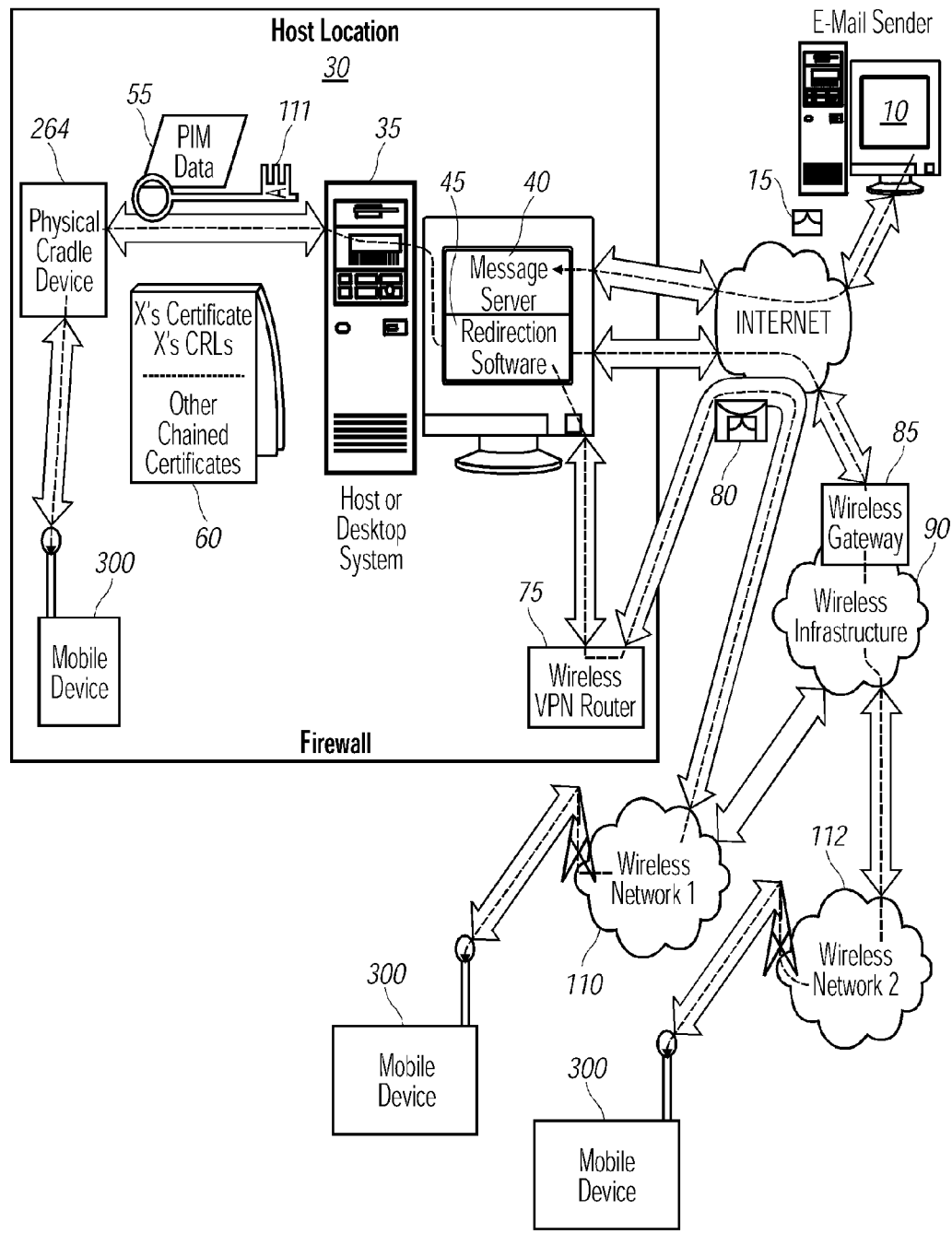
FIG. 2 is block diagram of an exemplary communication system in which a handheld communication device may be used.

As shown in FIG. 2, an e-mail sender system 10 may, for example, be connected to an ISP on which a user of a the system 10 has an account, located within a company, possibly connected to a local area network (LAN), and connected to the Internet 20, or connected to the Internet 20 through a larger ASP. Alternatively, the connection to the Internet can be through a wide area network (WAN). The message server 40 may be implemented, for example on a network computer within the firewall of a corporation, a computer within an ISP or ASP system or the like, and acts as the main interface for e-mail exchange over the Internet 20. Although other messaging systems might not require a message server system 40, a handheld device 300 configured for receiving and possibly sending e-mail will normally be associated with an account on a message server. Message servers such as server 40 typically extend beyond just sending and receiving e-mail; they also include dynamic database storage engines that have predefined database formats for data like calendars, to-do lists, task lists, e-mail and documentation.

The wireless gateway 85 and infrastructure 90 provide a link between the Internet 20 and wireless network 112. The wireless infrastructure 90 determines the most likely network for locating a given user and tracks the user as they roam between networks. A message is then delivered to the handheld communication device 300 via a wireless transmission from a base station in the wireless network 112 to the handheld communication device 300.

As shown in FIG. 2, a composed e-mail message 15 is sent by the e-mail sender 10, located on the Internet 20. This message 15 arrives at the message server 40 and is normally stored in a message store. Some messaging systems require that the handheld communication device 300 request that stored messages be forwarded by the message server to the device 300. Other systems provide for automatic routing of such messages, these messages are addressed using a specific e-mail address associated with the device 300. In a preferred embodiment, described in further detail below, messages addressed to a message server account associated with a host system such as a home computer or office computer, which belongs to the user of a communication device 300, are redirected from the message server 40 to the communication device 300 as they are received.

Additionally, the system of FIG. 2 includes a host system 30, a redirection program 45, a physical cradle device 65, a wireless VPN router 75, and another wireless network 110. Although the encoded message processing systems and methods described herein may be applied to networks having many different topologies, the network of FIG. 2 is useful in understanding an automatic e-mail redirection system mentioned briefly above. The central host system 30 will typically be a corporate office or other LAN, but may instead be a home office computer or some other private system where mail messages are being exchanged. Within the host system 30 is the message server 40, running on a computer within the firewall of the host system, that acts as the main interface for the host system to exchange e-mail with the Internet 20. In the system of FIG. 2, the redirection program 45 enables redirection of data items from the server 40 to a communication device 300. Although the redirection program 45 is shown to reside on the same machine as the message server 40 for ease of presentation, there is no requirement that it must reside on the message server. The redirection program 45 and the message server 40 are designed to co-operate and interact to allow the pushing of information to communication devices 300. In this installation, the redirection program 45 takes confidential and non-confidential corporate information from a specific user and redirects it out through the corporate firewall to the communication devices 300. This push technique may use a wireless friendly encoding, compression and encryption technique to deliver all information to a mobile device, thus effectively extending the security firewall to include each communication device 300 associated with the host system 30.

As shown in FIG. 2, there may be many alternative paths for getting information to the handheld communication device 300. One method for loading information onto the handheld communication device 300 is through a port designated 72, using a device cradle 264. This method tends to be useful for bulk information updates often performed at initialization of a handheld communication device 300 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection to a wireless gateway 85 and a wireless infrastructure 90, as described above. The concept of a wireless VPN router 75 is new in the wireless industry and implies that a VPN connection could be established directly through a specific wireless network 110 to a handheld communication device 300. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every handheld communication device 300 and thus make it possible to push information to a handheld communication device 300 at any time. A principal advantage of using this wireless VPN router 75 is that it could be an off-the-shelf VPN component, thus not requiring the use of a separate wireless gateway 85 and wireless infrastructure 90. A VPN connection would preferably be a Transmission Control Protocol (TCP)/IP or User Datagram Protocol (UDP)/IP connection to deliver the messages directly to the handheld communication device 300. If a wireless VPN 75 is not available, then a link to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the handheld communication device 300. As this redirection takes place, the message 15 is re-enveloped, as indicated at 80, and a possibly proprietary compression and encryption algorithm can then be applied to the original message 15. In this way, messages being read on the handheld communication device 300 are no less secure than if they were read on a desktop workstation such as 35 within the firewall. All messages exchanged between the redirection program 45 and the handheld communication device 300 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the handheld communication device 300 allows the received message to appear as though the message originated from the user's desktop system 35 rather than the handheld communication device 300.

With reference back to the port 72 and cradle 65 connectivity to the handheld communication device 300, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time, this data tends to be large in quantity, bulky in nature and requires a large bandwidth to get loaded onto the handheld communication device 300 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and handheld communication device 300 share one personality and one method for accessing all mail. The Cert and CRLs are normally exchanged over such a link because they represent a large amount of the data that is required by the device for S/MIME, PGP and other public key security methods.

Figure 3:
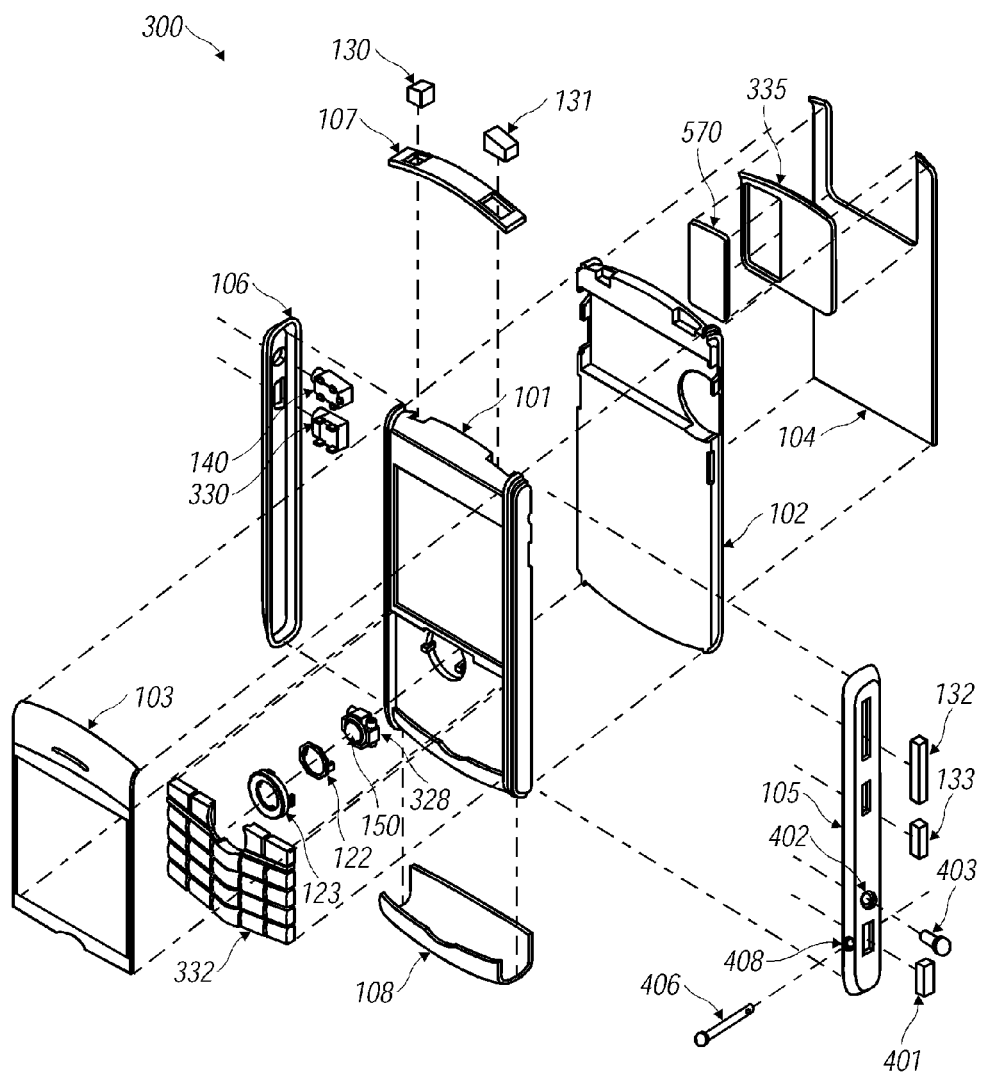
FIG. 3 is an exploded perspective view of an exemplary wireless handheld electronic device incorporating a trackball assembly.

An exemplary handheld electronic device 300 is shown in the assembly drawing of FIG. 3 and its cooperation in a wireless network is exemplified in the block diagram of FIG. 18. These figures are exemplary only, and those persons skilled in the art will appreciate the additional elements and modifications necessary to make the device work in particular network environments.

FIG. 3 is an exploded view showing some of the typical components found in the assembly of the handheld electronic device 300. The construction of the device benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments more than one switch or less than one switch per key are possible configurations. The support frame 101 holds the keyboard 332 and navigation tool 328 in place above the PCB 102. The support frame 101 also provides an attachment point for the display (not shown). A lens 103 covers the display to prevent damage. When assembled, the support frame 101 and the PCB 102 are fixably attached to each other and the display is positioned between the PCB 102 and support frame 101.

The navigation tool 328 is frictionally engaged with the support frame 101, but in a preferred embodiment the navigation tool 328 is removable when the device is assembled. This allows for replacement of the navigation tool 328 if it becomes damaged or the user desires replacement with a different type of navigation tool 328. In the exemplary embodiment of FIG. 3, the navigation tool 328 is a trackball 150 based device. When the navigation tool 328 has a trackball 150, the trackball 150 itself can be removed without removal of the navigation tool 328. The removal of the trackball 150 is enabled through the use of an outer removable ring 123 and an inner removable ring 122. These rings 122, 123 ensure that the navigation tool 328 and the trackball 150 are properly held in place against the support frame 101.

The camera module 335 is located together with a backplate 104 on the rear side of the device. The camera module 335 is capable of being removed and other modules (not shown) inserted in place of the camera module. The camera module 335 houses the camera assembly 570, which includes a camera 550, a flash 560, and a mirror 565 (further details of which are shown in FIG. 1b).

A serial port (preferably a Universal Serial Bus port) 330 and an earphone jack 140 are fixably attached to the PCB 102 and further held in place by left side element 105. Buttons 130, 131, 132, 133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 105, 106 provide additional protection and strength to the support structure of the device 300. In a preferred embodiment, backplate 104 is removably attached to the other elements of the device.

The block diagram of FIG. 18, representing the communication device 300 interacting in the communication network 319, shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, flash memory 324, camera module 335, and position determiner 337. Other communications subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take the form of a variety of different subsystems including the above described navigation tool 328. The navigation tool 328 is preferably a trackball based device, but it can be a four way navigational pad, joystick, trackwheel, touch pad, or a roller barrel. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure.

In a preferred embodiment, the communication device 300 is designed to wirelessly connect with a communication network 319. Some communication networks that the communication device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, the device state 350, connect module 360, and IT policy module 362. Furthermore, programs 358 and other information 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to e-mail, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrow-band, data-only technologies mainly used for short burst wireless data transfer.

For the systems listed above, the communication device 300 must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. In some locations, the communication device 300 will be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae 316, 318 in another preferred embodiment are combined into a single antenna (not shown). As one skilled in the art would appreciate, the antenna or antennae 316, 318 in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae 316, 318 as described above, local oscillators (LOs) 313, and a processing module 320 which in a preferred embodiment is a digital signal processor (DSP) 320.

A signal received by the communication device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (e-mail) messages. Typically an e-mail is text based, but can also include other types of data such as picture files, attachments and html. While these are given as examples, other types of messages are considered within the scope of this disclosure as well.

When the e-mail originates from a source outside of the device and is communicated to the device 300, it is first received by the receiving antenna 316 and then transmitted to the receiver 312. From the receiver 312, the e-mail message is further processed by the DSP 320, and it then reaches the microprocessor 338. The microprocessor 338 executes instructions as indicated from the relevant programming instructions to display, store or process the e-mail message as directed by the program. In a similar manner, once an e-mail message has been properly processed by the microprocessor 338 for transmission to the communication network 319, it is first sent to the DSP 320, which further transmits the e-mail message to the transmitter 314. The transmitter 314 processes the e-mail message and transmits it to the transmission antenna 318, which broadcasts a signal to be received by a communication network 319. While the above has been described generally, those skilled in this art will appreciate those modifications which are necessary to enable the communication device 300 to properly transmit the e-mail message over a given communication network 319.

Furthermore, the e-mail message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the e-mail message. Once the e-mail message is generated, the user may execute a send command which directs the e-mail message from the communication device 300 to the communication network 319. In an exemplary embodiment, a keyboard 332, preferably an alphanumeric keyboard, is used to compose the e-mail message. In a preferred embodiment, an auxiliary I/O device 328 is used in addition to the keyboard 332.

While the above has been described in relation to e-mail messages, one skilled in the art could easily modify the procedure to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding handheld electronic devices 300 and wireless handheld communication devices 300 as well as the communication networks within which they cooperate. It should be appreciated, however, that a focus of the present disclosure is the enablement of restricting the operation of camera on a handheld communication device by use of selective enablement and disablement devices.

What is claimed is:

1. A handheld communication device capable of transmitting and receiving at least voice and text communication, said device comprising:

a body assembly having a front face arranged to be directed toward an operator of the device when held in a text communicating orientation;

a display screen and a text-input keyboard each being exposed at the front face of said body assembly, said keyboard comprising a plurality of keys that include a set of alphabetic keys with which QWERTY-arranged alphabetic characters are associated;

an integrated camera assembly configured for taking photographs and said communication device enabled to wirelessly communicate photographs taken with said camera assembly to a remote receiver, said camera assembly including a photo-initiating actuator having an actuated position and an unactuated position and a selective disablement device; and said selective disablement device comprises a removable pin that when inserted into a pin-receiver on said device prevents said photo-initiating actuator from moving from said unactuated position to said actuated position.

2. The device as recited in claim 1, wherein said camera assembly comprises a selective enablement device that in an enabled mode activates said photo-initiating actuator thereby permitting an operator to take photographs.

3. The device as recited in claim 2, wherein said selective enablement device further comprises a disabled mode in which said photo-initiating actuator is deactivated thereby preventing an operator from taking photographs.

4. The device as recited in claim 3, wherein said selective enablement device further comprises a removable key that when inserted in a key-receiver on said device, said photo-initiating actuator is activated thereby permitting an operator to take photographs.

5. The device as recited in claim 4, wherein said removable key is a pin with detectable physical characteristics required to activate said photo-initiating actuator thereby permitting an operator to take photographs.

6. The device as recited in claim 4, wherein said removable key is a programmable card with recorded information required to activate said photo-initiating actuator thereby permitting an operator to take photographs.

7. The device as recited in claim 1, wherein said selective disablement device further comprises a tamper-evidencing lock that enables a third party to temporarily prevent an operator from taking photographs.

8. The device as recited in claim 1, further comprising a trackball navigational tool exposed at said front face of said device and located adjacent said display screen, said trackball configured to affect cursor navigation on said display screen by an operator of the device.

9. The device as recited in claim 8, wherein said body assembly has a height greater than a width thereof and said device is configured to be held in a portrait orientation for text communication.

10. The device as recited in claim 9, wherein said trackball navigational tool is located substantially between said display screen and said keyboard.

11. The device as recited in claim 10, wherein said set of alphabetic keys with which QWERTY-arranged alphabetic characters are associated comprises twenty-six keys with one English-alphabet character associated with each of said twenty-six keys.

12. The device as recited in claim 10, wherein said set of alphabetic keys with which QWERTY-arranged alphabetic characters are associated comprises fewer than twenty-six keys with one than one English-alphabet character associated with at least one of said alphabetic keys.

13. A handheld communication device capable of transmitting and receiving at least text communication, said device comprising:
   a body assembly having a front face arranged to be directed toward an operator of the device when held in a text communicating orientation;
   a display screen and a text-input keyboard each being exposed at the front face of said body assembly, said keyboard comprising a plurality of keys that include a set of alphabetic keys with which one of QWERTY-, QWERTZ-, AZERTY- or Dvorak-arranged alphabetic characters are associated;
   an integrated camera assembly configured for taking photographs and said communication device enabled to wirelessly communicate photographs taken with said camera assembly to a remote receiver, said camera assembly including a photo-initiating actuator having an actuated position and an unactuated position and a selective disablement device; and
   said selective disablement device comprises a removable pin that when inserted into a pin-receiver on said device prevents said photo-initiating actuator from moving from said unactuated position to said actuated position.

14. The device as recited in claim 13, wherein said handheld communication device is capable of transmitting and receiving e-mail.

* * * * *